US010157171B2

(12) United States Patent
Iida et al.

(10) Patent No.: US 10,157,171 B2
(45) Date of Patent: Dec. 18, 2018

(54) ANNOTATION ASSISTING APPARATUS AND COMPUTER PROGRAM THEREFOR

(71) Applicant: National Institute of Information and Communications Technology, Tokyo (JP)

(72) Inventors: Ryu Iida, Tokyo (JP); Kentaro Torisawa, Tokyo (JP); Chikara Hashimoto, Tokyo (JP); Jonghoon Oh, Tokyo (JP); Kiyonori Ootake, Tokyo (JP); Yutaka Kidawara, Tokyo (JP)

(73) Assignee: National Institute of Information and Communications Technology, Tokyo (JP)

( * ) Notice: Subject to any disclaimer, the term of this patent is extended or adjusted under 35 U.S.C. 154(b) by 0 days.

(21) Appl. No.: 15/544,227

(22) PCT Filed: Jan. 20, 2016

(86) PCT No.: PCT/JP2016/051577
§ 371 (c)(1),
(2) Date: Jul. 17, 2017

(87) PCT Pub. No.: WO2016/117607
PCT Pub. Date: Jul. 28, 2016

(65) Prior Publication Data
US 2018/0011830 A1 Jan. 11, 2018

(30) Foreign Application Priority Data
Jan. 23, 2015 (JP) .................................. 2015-011491

(51) Int. Cl.
*G06F 17/22* (2006.01)
*G06F 17/24* (2006.01)
(Continued)

(52) U.S. Cl.
CPC ........ *G06F 17/241* (2013.01); *G06F 17/2755* (2013.01); *G06F 17/2863* (2013.01); *G06F 3/0482* (2013.01); *G06F 17/2705* (2013.01)

(58) Field of Classification Search
CPC ............... G06F 17/241; G06F 17/2755; G06F 17/2863; G06F 3/0482; G06F 17/2705
See application file for complete search history.

(56) References Cited

U.S. PATENT DOCUMENTS 6,442,524 B1 * 8/2002 Ecker .................. G06F 17/2755
704/257
6,925,432 B2 * 8/2005 Lee .................... G06F 17/30707
704/5
(Continued)

FOREIGN PATENT DOCUMENTS

JP 2004-005648 A 1/2004

OTHER PUBLICATIONS

Ryu Iida et al., "Annotating Predicate-Argument Relations and Anaphoric Relations: Findings from the Building of the NAIST Text Corpus", Journal of Natural Language Processing, vol. 17, No. 2, pp. 25-50, 2010. Note: discussion in specification.
(Continued)

*Primary Examiner* — Maikhanh Nguyen
(74) *Attorney, Agent, or Firm* — Renner Otto Boisselle & Sklar, LLP

(57) ABSTRACT

An annotation data generation assisting system includes: an input/output device receiving an input through an interactive process; morphological analysis system 380 and dependency parsing system performing morphological and dependency parsing on text data in text archive; first to fourth candidate generating units detecting a zero anaphor or a referring expression in the dependency relation of a predicate in a sequence of morphemes, identifying a position as an object of annotation and estimating candidates of expres-
(Continued)

sions to be inserted by using language knowledge; a candidate DB storing estimated candidates; and an interactive annotation device reading candidates of annotation from candidate DB and annotate a candidate selected by an interactive process by input/output device.

6 Claims, 17 Drawing Sheets

(51) Int. Cl.
*G06F 17/27* (2006.01)
*G06F 17/28* (2006.01)
*G06F 3/0482* (2013.01)

(56) References Cited

U.S. PATENT DOCUMENTS

| | | | | |
|---|---|---|---|---|
| 8,484,622 | B2* | 7/2013 | Kuboki | G06F 11/008 704/9 |
| 8,527,262 | B2* | 9/2013 | Kambhatla | G06F 17/2785 434/322 |
| 8,737,771 | B2* | 5/2014 | Liu | G06F 17/30256 382/159 |
| 8,874,568 | B2* | 10/2014 | Stankiewicz | G06F 17/30654 707/728 |
| 9,141,601 | B2* | 9/2015 | Hamada | G06F 17/2755 |
| 9,171,542 | B2* | 10/2015 | Gandrabur | G10L 15/1815 |
| 9,575,937 | B2* | 2/2017 | Kuroiwa | G06F 17/2211 |
| 9,875,231 | B2* | 1/2018 | Zhao | G06F 17/2863 |
| 9,904,677 | B2* | 2/2018 | Hamada | G06F 17/27 |
| 2003/0212544 | A1 | 11/2003 | Acero et al. | |
| 2005/0273314 | A1* | 12/2005 | Chang | G06F 17/2705 704/4 |
| 2007/0067153 | A1* | 3/2007 | Nakagawa | G06F 17/273 704/4 |
| 2008/0162117 | A1* | 7/2008 | Bangalore | G06F 17/2818 704/10 |
| 2010/0049705 | A1* | 2/2010 | Ochi | G06F 17/30011 707/727 |
| 2011/0229017 | A1* | 9/2011 | Liu | G06F 17/30038 382/159 |
| 2011/0265065 | A1* | 10/2011 | Kuboki | G06F 11/008 717/131 |
| 2012/0117092 | A1* | 5/2012 | Stankiewicz | G06F 17/30654 707/755 |
| 2012/0183935 | A1* | 7/2012 | Hamada | G06F 17/2755 434/167 |
| 2013/0013290 | A1* | 1/2013 | Funakoshi | G06F 17/279 704/9 |
| 2013/0151957 | A1* | 6/2013 | Kuroiwa | G06F 17/2211 715/256 |
| 2014/0257792 | A1* | 9/2014 | Gandrabur | G10L 15/1815 704/9 |
| 2016/0253309 | A1* | 9/2016 | Zhao | G06F 17/2863 704/9 |

OTHER PUBLICATIONS

Sameer S. Pradhan et al., "Unrestricted Coreference: Identifying Entities and Events in OntoNotes", Proceedings of the 2007 International Conference on Semantic Computing, pp. 446-453, 2007.
Yannick Versley et al., "BART: A Modular Toolkit for Coreference Resolution", Proceedigs of the 46th Annual Meeting of the Association for Computational Linguistics, pp. 9-12, 2008.
Ryu Iida et al., "A Cross-Lingual ILP Solution to Zero Anaphora Resolution", Proceedings of the 49th Annual Meeting of the Association for Computational Linguistics: Human Language Technologies, pp. 804-813, 2011. Note: discussion in specification.
Machine Translation of Shinpei Kawaguchi et al., "Shoo Kaiseki ni Chishikigen o Riyo shita Kanren Shitsumongun ni Taisuru Shitsumon Oto", Proceedings of the 12th Annual Meeting of the Association for Natural Language Processing, pp. 927-930, Mar. 13, 2006.
Kazushi Ikeda et al., "Estimation and Complementation Approach for the Analysis of the Omission of Postposition on Colloquial Style Sentences", IPSJ SIG Technical Report, pp. 1-8, Dec. 15, 2010.
Machine Translation of Takafumi Suzuki et al., "Daihyo-Hasei Kankei o Riyo shita Nihongo Kino Hyogen no Kaiseki Hoshiki no Hyoka", Proceedings of the 18th Annual Meeting of the Association for Natural Language Processing, [CD-ROM], pp. 598-601, Mar. 13, 2012.
Partial Machine Translation of Yuji Matsumoto, "Corpus Annotation and Annotation-Assistance Tools", Journal of Japanese Society for Artificial Intelligence, Sep. 1, 2009, vol. 24, No. 5, pp. 632-639.

* cited by examiner

CAUSAL KNOWLEDGE — 290
X SMOKES → X INCREASES POSSIBILITY OF LUNG CANCER
...  ...

ENTAILMENT KNOWLEDGE — 292
X IS AN AUTHOR OF Y →  X WROTE Y
...  ...

EVENT OCCURRENCE ORDER KNOWLEDGE — 294
X FINDS Y  →  X PUBLISHES Y
X COOKS Y  →  Z EATS Y (X≒Z)
...  ...

EVENT OCCURRENCE INHIBITORY KNOWLEDGE — 296
X IS PROHIBITED  →  X CANNOT BE PUBLISHED
...

| VERB | GRAMMATICAL ROLE | QUESTION TYPE |
|---|---|---|
| ... | ... ... | |
| EAT | SUBJECT | WHO |
| EAT | OBJECT | WHAT |
| ... | ... ... | |
| WARD OFF | SUBJECT | WHAT |
| WARD OFF | OBJECT | WHAT |
| ... | ... ... | |

FIG. 11
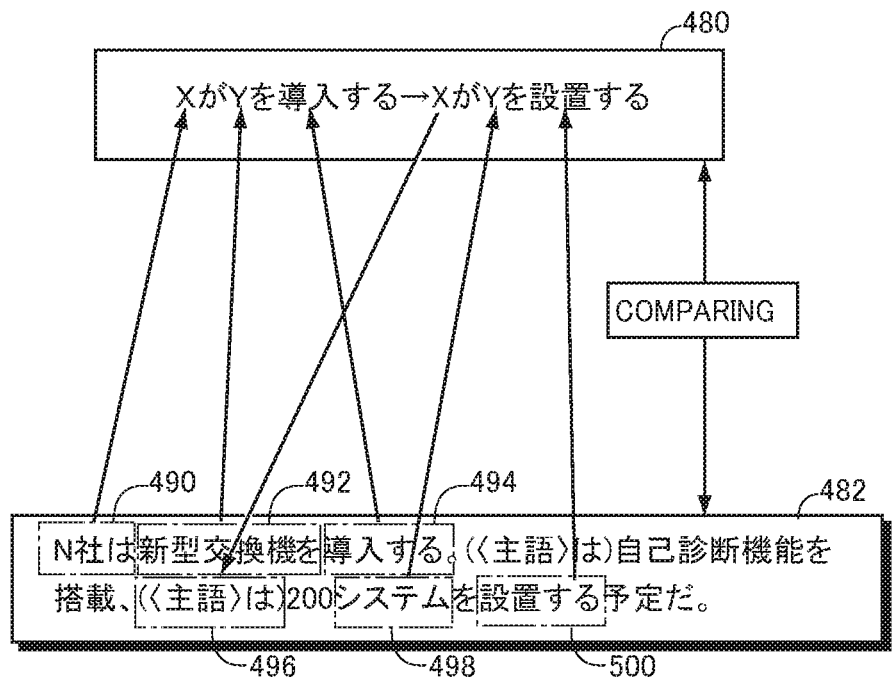
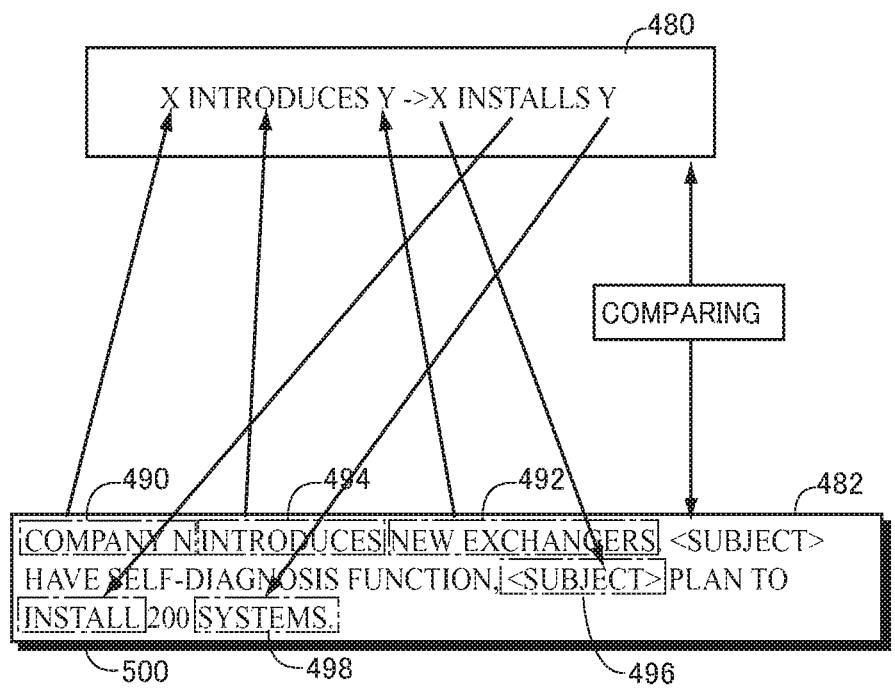

FIG. 12
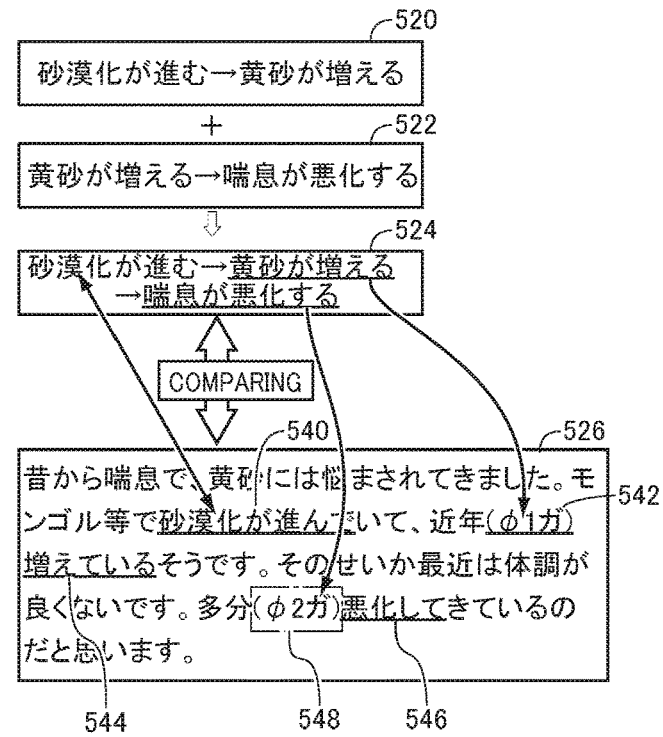
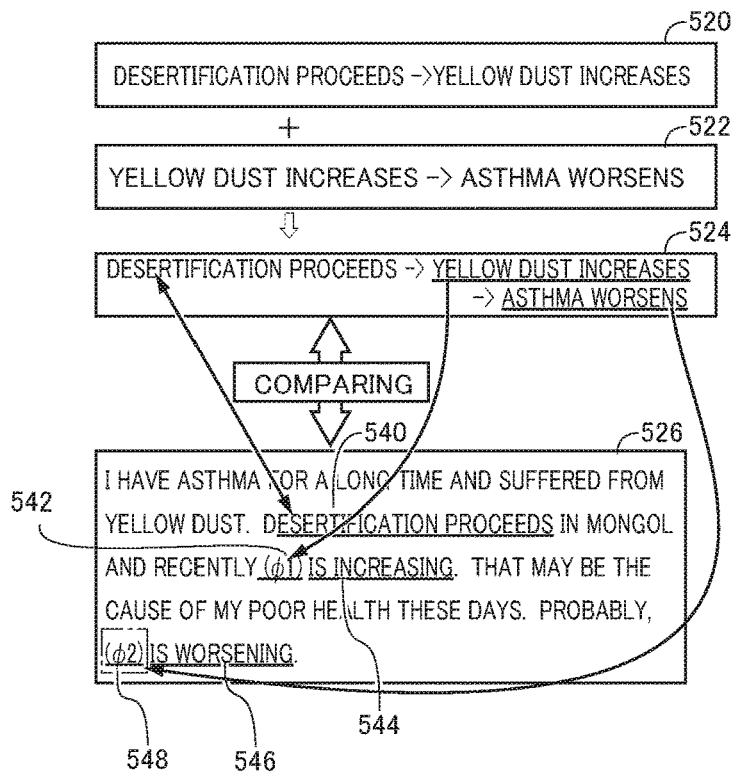

FIG. 13
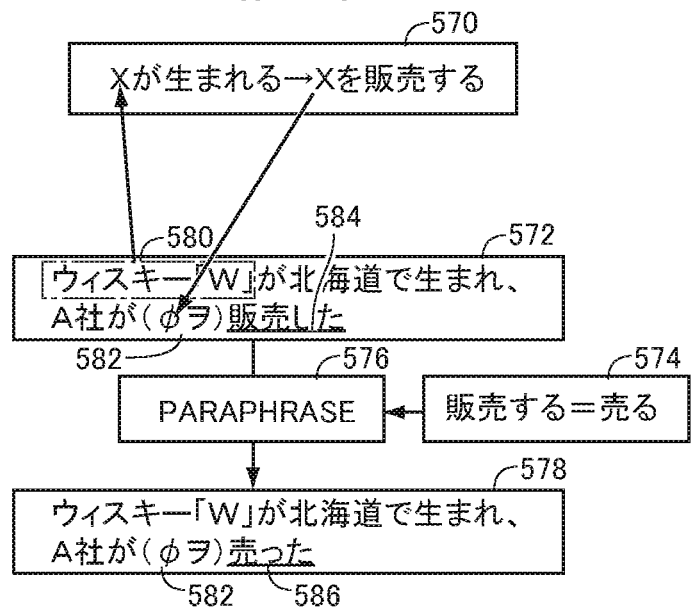
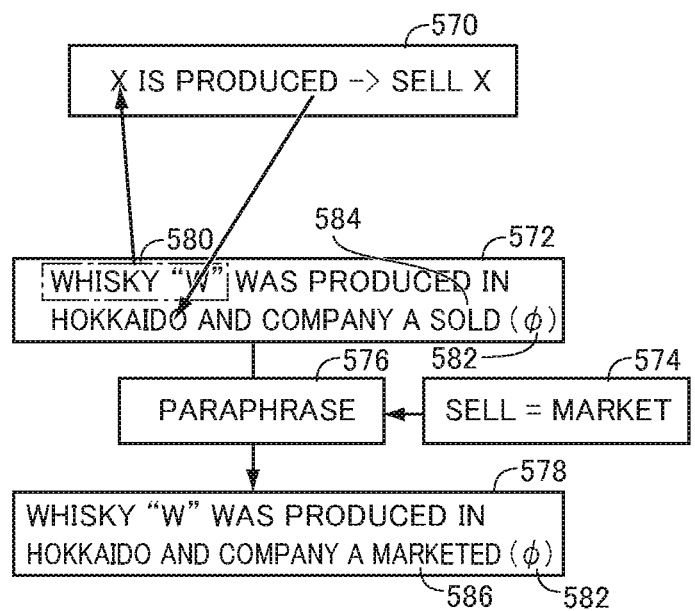

ANNOTATION ASSISTING APPARATUS AND COMPUTER PROGRAM THEREFOR

TECHNICAL FIELD

The present invention relates to natural language processing and, more specifically, to an annotation assisting apparatus for efficiently annotating text in connection with anaphoric relation of referring expressions such as pronouns and zero anaphora, which frequently appear in natural language sentences.

BACKGROUND ART

In natural language text, anaphoric phenomena for (zero-) anaphors frequently occur. Let us take an example of text 30 in FIG. 1. Example text 30 consists of first and second sentences. The second sentence includes a referring expression (pronoun) 42 「それ」 (it). Here, the referring expression refers back to the expression 40 「モン暦の正月の日付」 (date of new year in MON calendar) in the first sentence. Such a process of identifying the word to which the referring expression refers back is called "anaphora resolution." On the other hand, see another example of text 60 in FIG. 2. This example text 60 consists of first and second sentences. In the second sentence, the subject of the verb phrase 「自己診断機能を搭載」 (have self-diagnosis function) is omitted. Here, the portion 76 of the omitted subject corresponds to the words 72 「新型交換機」 (new exchangers) of the first sentence. Likewise, the subject of the verb phrase [200 システムを設置する予定だ」 (plan to install 200 systems) is omitted. At this omitted portion 74, the words 70 [N社」 (Company N) of the first sentence are omitted. Such a process of detecting zero anaphors and the like and to identify their antecedents is called "zero anaphora resolution." In the following, anaphora resolution and zero anaphora resolution will be collectively referred to as "(zero-)anaphora resolution."

In a field of so-called artificial intelligence, natural language processing is indispensable for realizing communication with humans. Machine translation and question-answering are major problems in natural language processing. The technique of (zero-)anaphora resolution is an essential technology for machine translation and question-answering. (Zero-) anaphora resolution, however, has not yet developed to a technical level sufficiently high to be used practically, though development varies depending on languages.

There are various reasons why it is difficult to improve performance of (zero-)anaphora resolution. One of the main reasons is that general knowledge is necessary for such resolution. To introduce general knowledge, however, it is necessary to consider human judgment regarding anaphora resolution. A resolution algorithm taking such factors into account, however, is difficult. Eventually, it becomes necessary to prepare a large number of human judgements as training data, and to build a resolver that performs (zero-) anaphora resolution through statistical learning. It has been known, however, that the cost for preparing training data to build such a resolver is prohibitively high. This leads to insufficient amount of training data and thus to insufficient performance of (zero-)anaphora resolution.

In order to enhance performance of natural language processing and to make artificial intelligence more intelligent, it is necessary to solve such a problem related to the (zero-)anaphora resolution.

Non-Patent Literature 1 listed below describes a technique of creating training data for (zero-)anaphora resolvers. According to this technique, the training data is created in the following manner. A human reads text from the beginning, and manually detects pronouns and zero anaphors. Machine assistance in this process is, by way of example, no more than listing antecedent candidates in advance.

Non-Patent Literature 2 listed below discloses a (zero-) anaphora resolution algorithm that automatically performs (zero-)anaphora resolution in accordance with a predetermined procedure. The technique disclosed in this article utilizes information output from morphological analysis, syntactic/dependency parsing (hereinafter simply referred to as "dependency parsing") and the like, as well as external resource tools such as dictionaries. The dictionary used here is a collection of selectional restrictions, such as "objects of a verb 「食べる」 (eat) are 「食べ物」 (foods)." The technique disclosed in Non-Patent Literature 2 additionally uses pieces of information obtained from text to identify antecedents for a given (zero-)anaphors.

CITATION LIST

Non Patent Literature

NPL 1:
Ryu IIDA, Mamoru KOMACHI, Naoya INOUE, Kentaro INUI and Yuji MATSUMOTO. "Annotating Predicate-Argument Relations and Anaphoric Relations: Findings from the Building of the NAIST Text Corpus." Natural Language Processing, Vol. 17, No. 2, pp. 25-50, 2010.
NPL 2:
Ryu Iida, Massimo Poesio. A Cross-Lingual ILP Solution to Zero Anaphora Resolution. The 49th Annual Meeting of the Association for Computational Linguistics: Human Language Technologies (ACL-HLT2011), pp. 804-813.2011.

SUMMARY OF INVENTION

Technical Problem

The report in Non-Patent Literature 2 mentioned above, however, shows that the existing method for Japanese anaphora resolution achieved 44% in recall and 42% in precision, and it also shows that the existing method of Japanese subject zero anaphora resolution only achieved 35% in both recall and precision. Zero anaphors and pronouns are frequently used in the documents we encounter in everyday living. Accurate detection of zero anaphors and accurate identification of their antecedents are essential for accurate natural language processing. For this purpose, it is necessary to develop a (zero-)anaphora resolver of high precision. Training (zero-)anaphora resolvers, however, is too costly as it involves immense amount of time and labor for preparing training data. The training data is created by manually annotating anaphoric relations of (zero-)anaphors in text. Naturally, the annotations themselves must have high precision and, therefore, it is necessary to reflect human judgement on the training data. In other words, in order to solve the above-described problems, it is desirable to have the task of making annotations itself done by humans, and to obtain a system that assists and makes the human task of making annotations more efficient.

Therefore, an object of the present invention is to provide an annotation assisting apparatus that allows a human to easily build annotation data for text and thereby to reduce the costs.

Solution to Problem

According to a first aspect, the present invention provides an annotation assisting apparatus assisting generation of annotation data for (zero-)anaphora resolution of natural language text. The annotation assisting apparatus includes: input/output means including a display device and an input device, for receiving a user input through an interactive process with a user; reading means for reading text data to be annotated from a text archive; analyzing means for performing morphological analysis and dependency parsing of the text data read by the reading means and for outputting a sequence of morphemes having information indicating dependency structure added; predicate searching means for searching the sequence of morphemes output from the analyzing means for a predicate; object identifying means for detecting, in dependency relation associated with each of the predicates searched by the predicate searching means, that a word assumed to have a prescribed relation with the predicate is missing or replaced by a referring expression, and for identifying the position of the word as an object of an annotating process; candidate estimating means for estimating, for each position of the word identified by the object identifying means, a candidate of an expression to be inserted to the position, by using a relation between the position and surrounding sequence of morphemes and using language knowledge prepared in advance; candidate storage means for storing a candidate estimated by the candidate estimating means in association with the position of the word; candidate displaying means for reading, for each of the object of annotating process, a candidate or candidates estimated by the candidate estimating means from the candidate storage means, and for displaying the candidate or candidates on the display device in a manner allowing the user to select any; and interactive selection means responsive to a user instruction selecting one of the candidates displayed by the candidate display means, for adding the selected candidate as an annotation to the position.

Preferably, the candidate estimating means includes: question sentence generating means for generating, for each of the positions of the words identified by the object identifying means, a sentence asking a word to fill the position of the word, by using a sequence of words around the position; question sentence input means for giving the question sentence generated by the question sentence generating means as an input to a question-answering system prepared in advance; and means for storing a candidate of word to be inserted to the position of the word, in association with the position of the word in the candidate storage means, based on the answer obtained from the question-answering system in response to the question sentence given from the question sentence input means.

More preferably, the candidate estimating means further includes: language knowledge storage means for storing a plurality of language knowledge rules; matching expression extracting means for identifying, for each position of the word identified by the object identifying means, an expression including the position of the word and the predicate used for identifying the position of the word and matching one of the language knowledge rules stored in the language knowledge storage means; and means, by comparing the expressions extracted by the matching expression extracting means and the language knowledge rule that matches the expression, for storing, from among the expressions, an expression to be inserted to the position of the word identified by the object identifying means, as a candidate of character sequence to be inserted to the position of the word, in the candidate storage means.

Further preferably, the candidate estimating means further includes: annotation searching means for searching text included in existing annotated text database prepared in advance for a portion having an annotation related to anaphoric relation; and means, for each portion searched by the annotation searching means, for modifying a sentence in accordance with a manner determined in advance for each annotation, and storing the modified portion as a candidate annotation for the searched portion, in the candidate storage means.

The candidate estimating means may further include: means for applying an analyzed sequence of morphemes output from the analyzing means as an input to another existing (zero-)anaphora resolver; and means, receiving a result of (zero-)anaphora resolution by the existing (zero-) anaphora resolver, for storing the result of (zero-)anaphora resolution in the candidate storage means.

According to a second aspect, the present invention provides a computer program causing a computer to operate as an annotation assisting apparatus that assists generation of annotation data for (zero-)anaphora resolution of natural language text. The program causes the computer to function as: input/output means for receiving a user input through an interactive process with a user using a display device and an input device of the computer; reading means for reading text data from a text archive as an object of annotation; analyzing means for performing morphological analysis and dependency parsing of the text data read by the reading means and for outputting a sequence of morphemes having information indicating dependency structure added; predicate searching means for searching the sequence of morphemes output from the analyzing means for a predicate; object identifying means for detecting, in dependency relation associated with each of the predicates searched by the predicate searching means, that a word assumed to have a prescribed relation with the predicate is missing or replaced by a referring expression, and for identifying the position of the word as an object of an annotating process; candidate estimating means for estimating, for each position of the word identified by the object identifying means, a candidate of an expression to be inserted to the position, by using a relation between the position and surrounding sequence of morphemes and using language knowledge prepared in advance; candidate storage means for storing a candidate estimated by the candidate estimating means in association with the position of the word; candidate displaying means for reading, for each of the object of the annotating process, a candidate or candidates estimated by the candidate estimating means from the candidate storage means, and displaying the candidate or candidates on the display device in a manner allowing the user to select any; and interactive selection means responsive to a user instruction selecting any of the candidates displayed by the candidate display means, for adding the selected candidate as an annotation to the position.

BRIEF DESCRIPTION OF DRAWINGS

FIG. 5 illustrates schematic configuration of rules constituting language knowledge.

FIG. 6 is a schematic diagram illustrating a schematic structure of a question type DB.

FIG. 11 is a diagram illustrating a process for generating an annotation candidate using the language knowledge.

FIG. 12 is a diagram illustrating a process for generating an annotation candidate using the language knowledge.

FIG. 13 is a diagram illustrating a process for generating an annotation candidate using the language knowledge.

DESCRIPTION OF EMBODIMENTS

Figure 1:
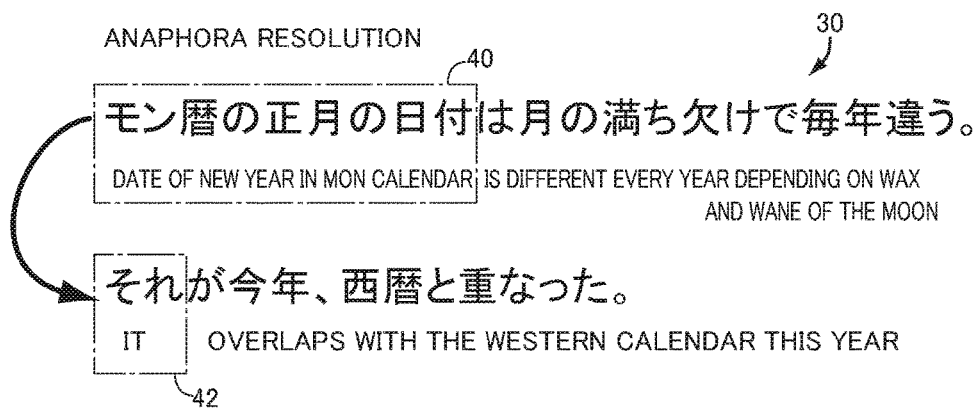
FIG. 1 is a schematic illustration showing anaphora resolution.

In the following description and in the drawings, the same components are denoted by the same reference characters. Therefore, detailed description thereof will not be repeated.

[Outline]

Figure 3:
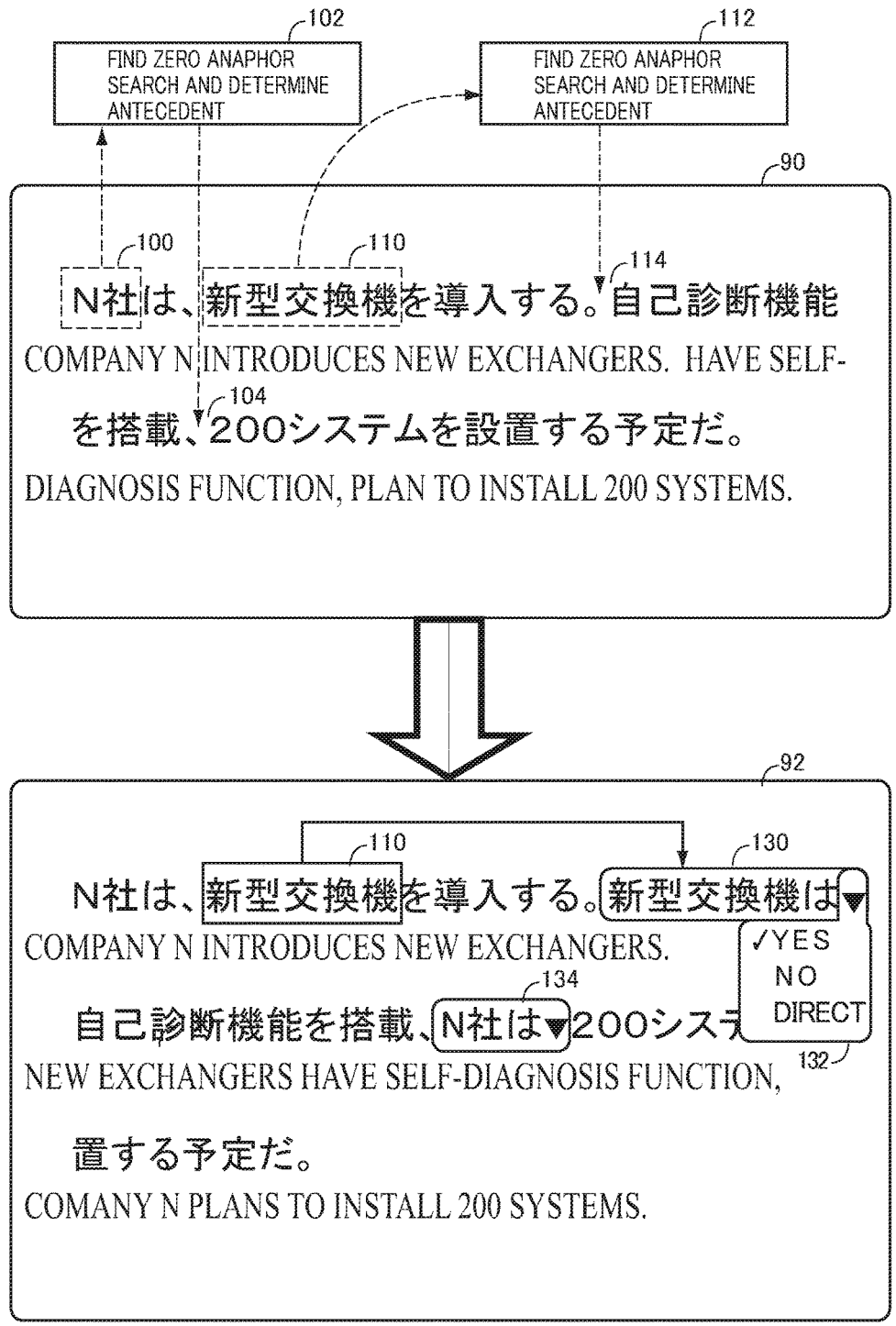
FIG. 3 is a schematic illustration showing a process of anaphora resolution.

Referring to FIG. 3, the task of making annotations to text by the training data generation assisting device in accordance with the first embodiment of the present invention will be summarized. Referring to the upper part of FIG. 3, on a screen of a display device, text 90 as an object to annotate is displayed. The text 90 consists of two sentences. The first sentence includes a predicate [導入する] "introduce", the subject of this predicate, words 100 [N新型交換機] "Company N", and the object of this predicate, words 110 [社] "new exchangers." The second sentence consists of two clauses. At the head of the former half of the sentence, there is a portion (portion of zero anaphor) 114 where the subject of [自己診断機能を搭載] "have self-diagnosis function" is omitted. Between the former half and the latter half of this sentence, there is a portion of zero anaphor 104 where the subject of [200システムを設置する予定だ] "plan to install 200 system" is omitted.

In (zero-)anaphora resolution, as described in rectangles 102 and 112, first, zero anaphor 104 or 114 is found. Thereafter, an expression to be identified as an antecedent is searched for and determined. The antecedent of zero anaphor 104 is the words 100. The antecedent of zero anaphor 114 is the words 110.

Conventionally, the tasks of detecting zero anaphors and identifying their antecedents are all done by a human. Such inefficient tasks, however, have been the cause of higher cost for creating the training data. In the present embodiment, the above-described tasks of detecting zero anaphors and searching for their antecedents are automatically done by a computer program. This process involves various methods and schemes as will be described in the following. Particularly, the language knowledge is utilized in a similar manner as humans do, to enable highly efficient detection of zero anaphors and searching for antecedent candidates.

When detecting zero anaphors and searching for antecedent candidates are complete, a process shown in the lower part of FIG. 3 is performed on each zero anaphors. In this example, assume that the antecedent of zero anaphor 114 shown in the upper part of FIG. 3, is the words 110, i.e., [新型交換機] "new exchangers" are found and for zero anaphor 104, a plurality of words including the words 100 are found. Here, training data generation assisting device inserts a sequence 130 that consists of the same words [新型交換機] "new exchangers" as words 110 and a subjective case particle into the portion of zero anaphor 114, and on the right side thereof, displays an icon "▼" indicating that there is a so-called dropdown list. When the user clicks this icon, a dropdown list 132 is displayed. On dropdown list 132, two options (YES, NO) asking whether the displayed candidate is the antecedent of zero anaphor 114, and an option allowing manual input by a human ([手入力] direct manual input) are displayed. When the user selects YES, the character sequence 130 is added as an annotation result for zero anaphor 114. If the user selects NO, no annotation is performed for zero anaphor 114. If the user selects "direct manual input," an input dialog, not shown, appears and allows direct input of annotation.

For the portion of zero anaphor 104, one of the candidates, such as a character sequence 134 consisting of the same words as words 100 and a case particle [ハ] (ha) is displayed, and on the right side, the icon "▼" indicating a dropdown list is displayed. When the user clicks this icon, a dropdown list is displayed, which includes a number of candidates and "direct manual input" as options. If the user selects one of the options, the candidate word or words are added as an annotation result for zero anaphor 104. If the user selects direct manual input, the operation is the same as that for the portion of zero anaphor 114.

[Overall Configuration of (Zero-)Anaphora Resolution System]

Figure 4:
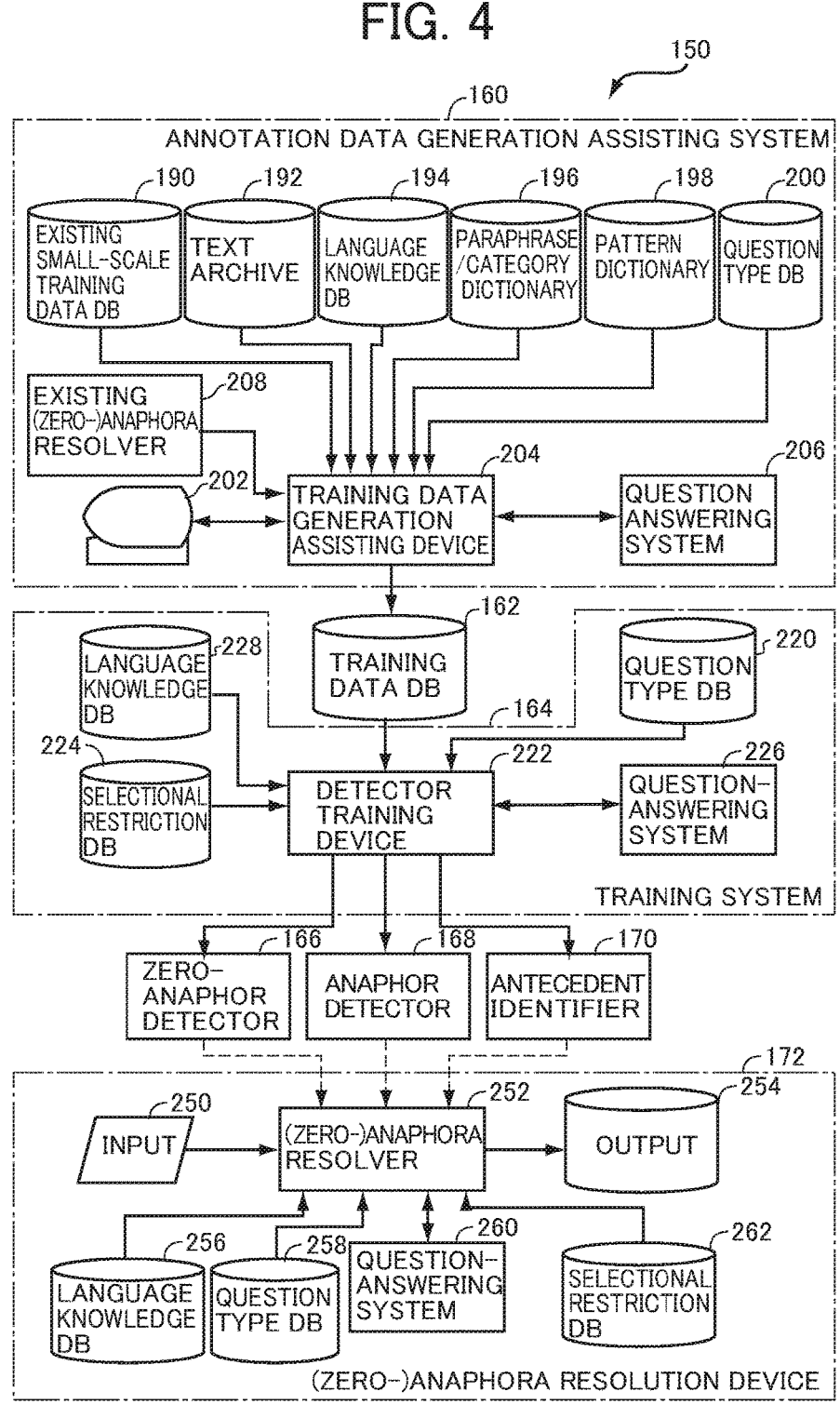
FIG. 4 is an overall block diagram of a system for (zero-)anaphora resolution including a training data generation assisting device in accordance with an embodiment of the present invention.

Referring to FIG. 4, first, the overall configuration of the (zero-)anaphora resolution system 150 using the training data generation assisting device in accordance with the present embodiment will be described.

(Zero-)anaphora resolution system 150 includes: an annotation data generation assisting system 160, detecting (zero-)anaphors in a huge amount of text prepared in advance, presenting to a user candidates of expressions (antecedents) referred to by these to allow user selection by a simple operation, and thereby assisting the user to generate training data (annotation data) for models necessary for (zero-)anaphora resolution; training data DB 162 storing the training data generated by the user using the annotation data generation assisting system 160; and a training system 164 for training a zero anaphor detector 166, an anaphor detector 168 and an antecedent identifier 170, which will be described later, using the training data stored in training data DB 162. Zero anaphor detector 166 detects a zero anaphor in any predicate in the text. Zero anaphor detector 166 includes a statistical model for detecting a zero anaphor where a subject, an object or the like is omitted in the text. Anaphor detector 168 includes a statistical model for detecting an anaphor pointing to another word or the like, using, as objects of classification, any noun phrases (anaphor candidates) in the text. Antecedent identifier 170 includes a detector for identifying an antecedent of zero anaphor, using predicates with zero anaphora and noun-phrases as antecedent candidates in the text as the objects of classification, and a detector for identifying an antecedent referred to by an anaphor, using pairs of noun phrases (anaphor and antecedent candidate) in the text as the objects of classification. These detectors have individual statistical models. In the present embodiment, zero anaphor detector 166, anaphor detector 168 and antecedent identifier 170 each use a Support Vector Machine (SVM) as a statistical model.

(Zero-)anaphora resolution system 150 further includes (zero-)anaphora resolution device 172 detecting (zero-)anaphors in input text, adding information identifying antecedents referred to by these and outputting the results, by using zero anaphor detector 166, anaphor detector 168 and antecedent identifier 170.

<Annotation Data Generation Assisting System 160>

Annotation data generation assisting system 160 includes: an input/output device 202 allowing interactive input from/output to a user using a display device and a keyboard and a mouse; and a training data generation assisting device 204 assisting the user's task of making annotations to a large amount of text stored in a text archive 192 by using various resources including language knowledge, and thereby generating training data and outputting the training data to training data DB 162.

The resources used by training data generation assisting device 204 includes: existing small-scale training data DB 190 storing training data similar to training data DB 162; language knowledge DB 194 storing, in the form of rules, language knowledge in a form applicable to the text stored in text archive 192; a paraphrase/category dictionary 196 storing paraphrase rules and categories used for paraphrasing expressions in the rules to other expressions or to replace a word in a rule to a different word, when training data generation assisting device 204 applies the language knowledge stored in language knowledge DB 194 to the text; and a pattern dictionary 198 storing patterns prepared beforehand to enable, when text has a specific pattern, identifying an omitted portion associated with the pattern.

Annotation data generation assisting system 160 further includes: a question-answering system 206 inquiring, when the training data generation assisting device 204 finds a zero anaphor in text, candidates of the word referred to by the zero anaphor; a question type DB 200 referred to by training data generation assisting device 204 when it creates a question to the question-answering system 206 based on the text; and an existing (zero-)anaphora resolver 208 performing (zero-)anaphora resolution on text for presenting candidates of zero anaphor, anaphor, antecedent or the like, to the training data generation assisting device 204, at the time of (zero-)anaphora resolution executed by training data generation assisting device 204.

Existing small-scale training data DB 190 may have any configuration or format provided that it enables identification of any zero anaphor, anaphor and antecedent in the text.

The text stored in text archive 192 is simple text in the present embodiment, and it is assumed that the text is not yet subjected to morphological analysis or syntactic/dependency parsing. The present invention, however, is not limited to such an embodiment. Morphological analysis or syntactic/dependency parsing or both may be executed by another system and text having information related to such analysis added may be used.

<Language Knowledge DB 194>

Referring to FIG. 5, language knowledge DB 194 stores roughly four different types of rules of language knowledge: causal knowledge 290; entailment knowledge 292; event occurrence order knowledge 294; and event occurrence inhibitory knowledge 296. Each knowledge may include a wildcard type variable (in the following, represented, for example, by "X", "Y" and the like) that can be replaced by any noun phrase, for example.

Causal knowledge 290 is, for example, an ordered pair of an expression corresponding to a cause such as "X smokes" and an expression corresponding to a result such as "X increases possibility of lung cancer." Here, it is assumed that the expression corresponding to the cause comes first and the expression corresponding to the result follows.

Entailment knowledge 292 represents, for example, that the expression "X is an author of Y" entails the expression "X wrote Y", by an ordered pair of these two expressions. Here, it is assumed that the entailing expression comes first and the entailed expression follows.

Event occurrence order knowledge 294 represents order relation of event occurrence, for example, the event of "X finds Y" can be followed by the event of "X publishes Y" by an ordered pair of these two expressions. Here, it is assumed that expressions are arranged in accordance with the order relation of events.

Event occurrence inhibitory knowledge 296 is an ordered pair of expressions having such a relation that if an event "X is prohibited" occurs, an event "X cannot be published" follows, or a relation that the occurrence of an event suppresses the occurrence of another event. Here, the event that occurs comes first, and the event of which occurrence is suppressed follows.

As will be described later, such knowledge can be applied by itself to the text. Besides, considering two pieces of knowledge, if an expression of a latter half of one piece of knowledge matches an expression of a former half of the other piece of knowledge, the two pieces of knowledge may be linked and applied. Here. "match" encompasses paraphrase of synonyms or entailment.

<Question Type DB 200>

Referring to FIG. 6, question type DB 200 is used when training data generation assisting device 204 obtains candidates of antecedents using question-answering system 206. Question type DB 200 has a plurality of entries. Each entry includes, for a verb as an example, the grammatical role of a zero anaphor in a dependency relation of the verb in an expression, and information (question type) representing in what form a question sentence is to be generated when the expression to be inserted to the omitted portion (zero anaphor) is searched for. For instance, consider a verb "eat." Assume that a subject of this verb is omitted in an expression. Then, by generating a sentence having "who" at the head, an expression to be the subject of "eat" would be obtained as an answer from the question-answering system.

<Question-Answering System 206>

Figure 7:
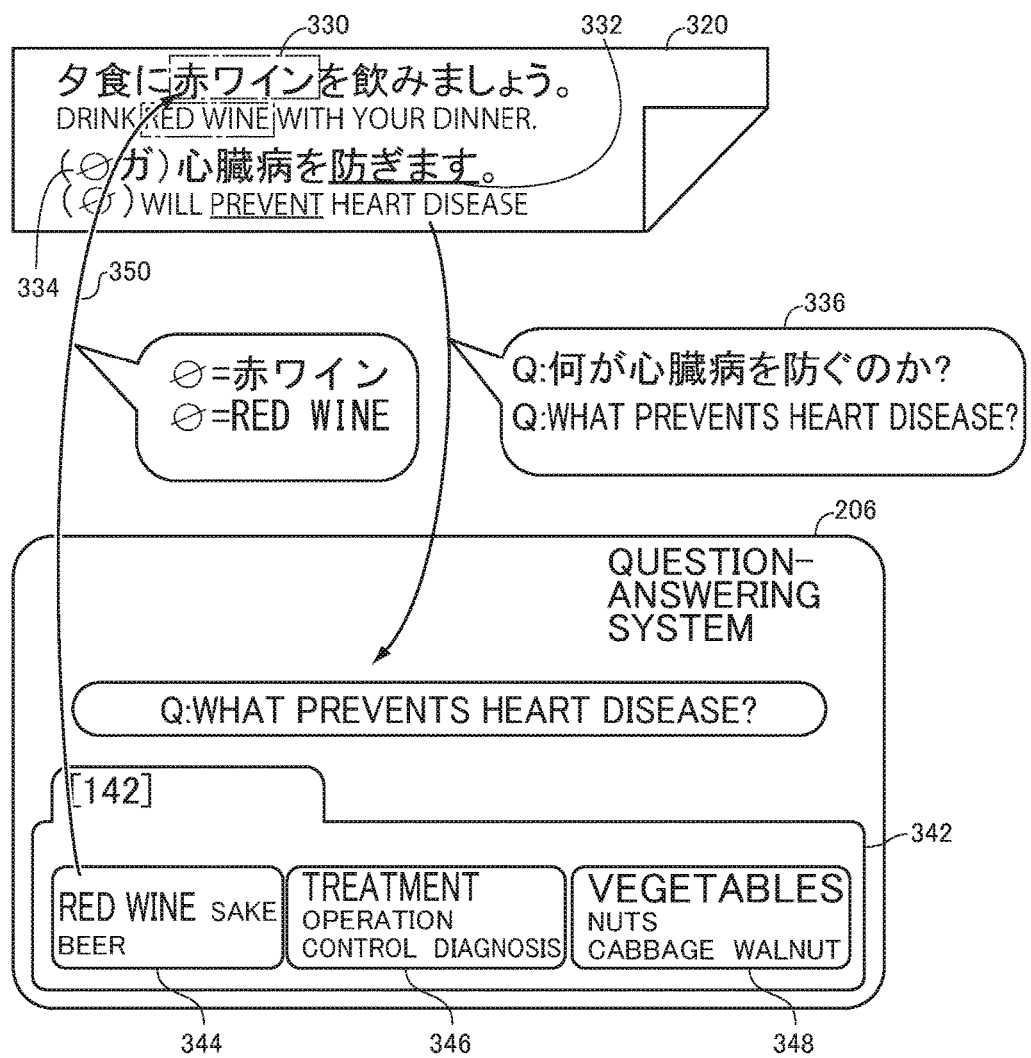
FIG. 7 is a schematic diagram illustrating a method of annotation using a question-answering system.

Referring to FIG. 7, a process of obtaining candidates of the expression pointed to by a zero anaphor using question-answering system 206 will be described. First, assume that input text 320 includes two sentences. The first sentence is 「夕食に赤ワインを飲みましょう」 (Drink red wine with your dinner), and the second sentence is 「心臓病を防ぎます」 (will prevent heart disease). At the head of the second sentence, the subject of verb 332 「防ぎます」 (prevent) is omitted, and a tag indicating the omission is added to this zero anaphor 334. Here, the zero anaphor should be filled by the words 330 「赤ワイン」 (red wine).

Here, in order to obtain candidates of expressions to be inserted to zero anaphor 334 from this text using the question-answering system, it is necessary to create an appropriate question sentence to be used as the input to the question-answering system 206. Here, it is necessary to know the subject of [防ぎます] (prevent) in the input text 320 having the zero anaphora. Though not shown, it is assumed that paraphrase/category dictionary 196 stores information that [予防] (ward off) and [防ぐ] (prevent) are interchangeable. Then, in question type DB 200 shown in FIG. 6, an entry having the verb [予防する] (ward off) and grammatical role is "subject" can be found. In the column of "question type," "what" is stored. From these pieces of information, training data generation assisting device 204 generates a question sentence 336 "What prevents heart disease?" In generating a question sentence, the tail of sentence is modified in accordance with rules prepared in advance so that it will be suitable for a question sentence. Rules of modification for the tail of sentences may be stored in advance for each entry of question type DB 200.

Referring to FIG. 7, receiving the question sentence 336, question-answering system 206 searches a database in the system for a group of word candidates 342 apt as answers to question sentence 336 and retrieves them. Further, question-answering system 206 divides the thus obtained group of word candidates to categories 344, 346 and 348 such that each of these categories includes one or more answer candidates, and transmits these to training data generation assisting device 204. Here, assume that category 344 includes [赤ワイン][酒][ビール] (red wine, sake, and beer). Other categories 346 and 348 are similar. By way of example, training data generation assisting device 204 selects, of these word candidates obtained in this manner, an expression that matches a word or words positioned prior to zero anaphor 334 in input text 320 (in this example, words 330 [赤ワイン] (red wine)), and the zero anaphor 334 and the words 330 as a candidate of referred entity subjected to annotation 350. The foregoing is the outline of annotation adding task using question-answering system 206.

<Existing (Zero-)Anaphora Resolver 208>

Figure 8:
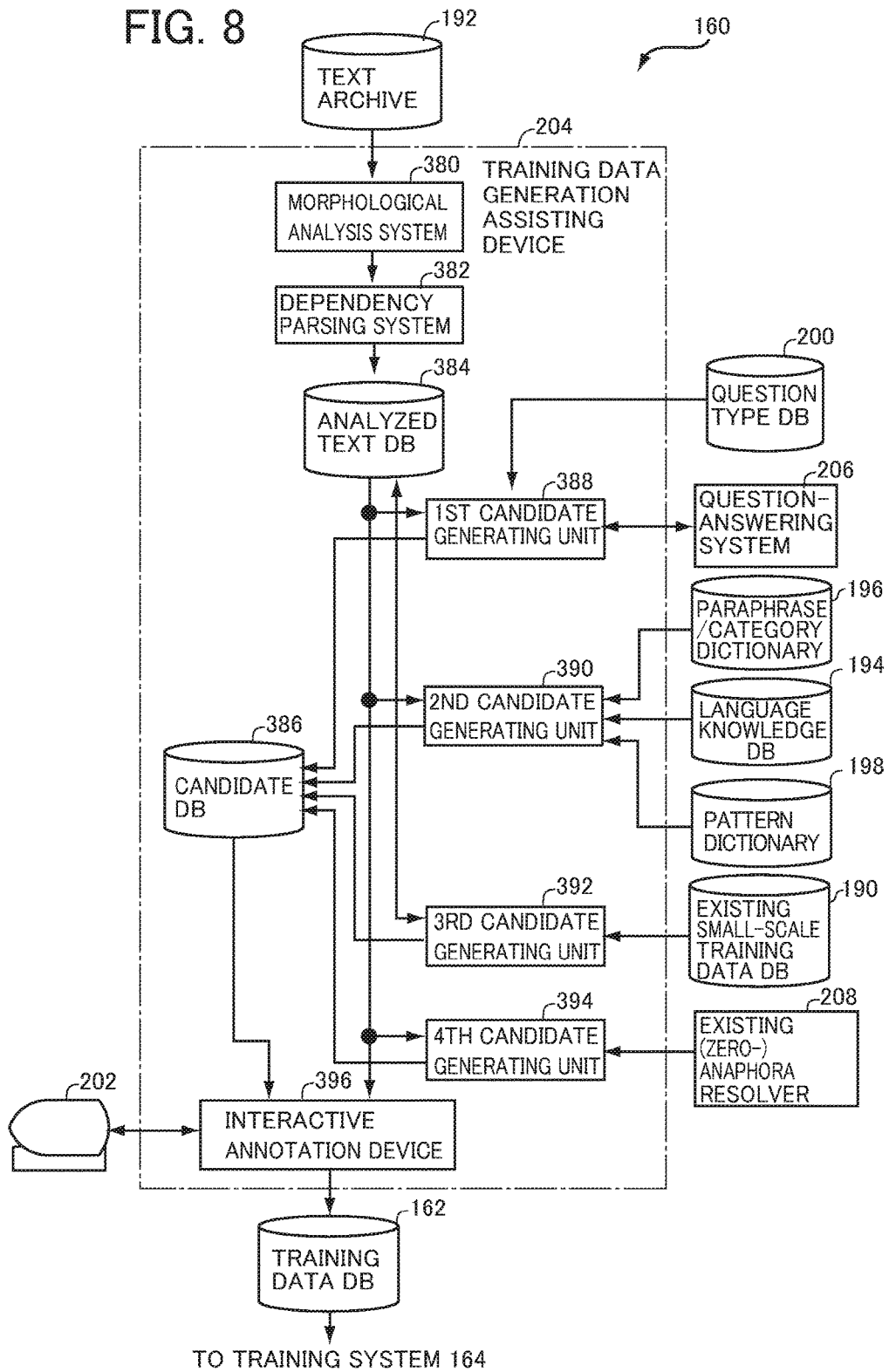
FIG. 8 is a block diagram of the training data generation assisting device.

Referring to FIG. 8, existing (zero-)anaphora resolver 208 is an existing device for performing (zero-)anaphora resolution. Here, existing (zero-)anaphora resolver 208 is used for presenting (zero-)anaphor candidates and antecedent candidates of (zero-)anaphors. Eventually, a human selects a correct candidate from these candidates. Therefore, existing (zero-)anaphora resolver 208 used here does not necessarily have a high precision.

<Training Data Generation Assisting Device 204>

Referring to FIG. 8, training data generation assisting device 204 includes: a morphological analysis system 380 performing morphological analysis on each text included in text archive 192 and outputting a sequence of morphemes having various pieces of grammatical information added; a dependency parsing system 382 performing syntactic and dependency parsing on the sequence of morphemes output from morphological analysis system 380 and outputting a sequence of morphemes having syntactic/dependency information added; and analyzed text DB 384 storing sequences of morphemes output from dependency parsing system 382 together with the grammatical information and the syntactic/dependency relations. Here, it is assumed that dependency parsing system 382 adds to each sequence of morphemes at least a piece of dependency information indicating which word depends on which word. Though not shown for simplicity in FIG. 8, in the present embodiment, each component in training data generation assisting device 204 operates in accordance with an instruction of a user given through input/output device 202.

Training data generation assisting device 204 further includes: a first candidate generating unit 388 detecting, in analyzed text stored in analyzed text DB 384, zero anaphora and generating a group of annotation candidates indicating an antecedent of each zero anaphor using question type DB 200 and question-answering system 206; a second candidate generating unit 390 detecting, in analyzed text stored in analyzed text DB 384, zero anaphora in the similar manner as first candidate generating unit 388, and generating a group of annotation candidates for the zero anaphora using language knowledge DB 194, paraphrase/category dictionary 196 and pattern dictionary 198, for each zero anaphor; a third candidate generating unit 392 generating new training data by changing a part of anaphoric relation and anaphoric relation of the training data stored in existing small-scale training data DB 190, and generating new annotation candidates from the new training data; and a fourth candidate generating unit 394 performing (zero-)anaphora resolution on the text stored in analyzed text DB 384 using existing (zero-)anaphora resolver 208, thereby generating annotation candidates as.

Training data generation assisting device 204 further includes: candidate DB 386 storing groups of annotation candidates output from first, second, third and fourth candidate generating units 388, 390, 392 and 394 in association with a zero anaphor, an anaphor and the like to which each annotation is to be made; and an interactive annotation device 396 displaying, for each zero anaphor and each anaphor of each text stored in analyzed text DB 384, candidates thereof in a selectable form on the display device of input/output device 202 with reference to candidate DB 386, for receiving an input of selection by the user, and outputting the selected inputs as training data to training data DB 162.

Again referring to FIG. 4, training system 164 includes: question type DB 220 and question-answering system 226, similar to question type DB 200 and training data generation assisting device 204 used in annotation data generation assisting system 160, respectively; selectional restriction DB 224 describing the restrictions posed on antecedents to be selected when antecedent identifier 170 is trained, as will be described later, language knowledge DB 228 storing language knowledge, having the same configuration as language knowledge DB 194 used in annotation data generation assisting system 160; and a detector training device 222 performing training of zero anaphor detector 166, anaphor detector 168 and antecedent identifier 170, using the training data stored in training data DB 162, question type DB 220, question-answering system 226, language knowledge DB 228 and selectional restriction DB 224.

<First Candidate Generating Unit 388>

Figure 9:
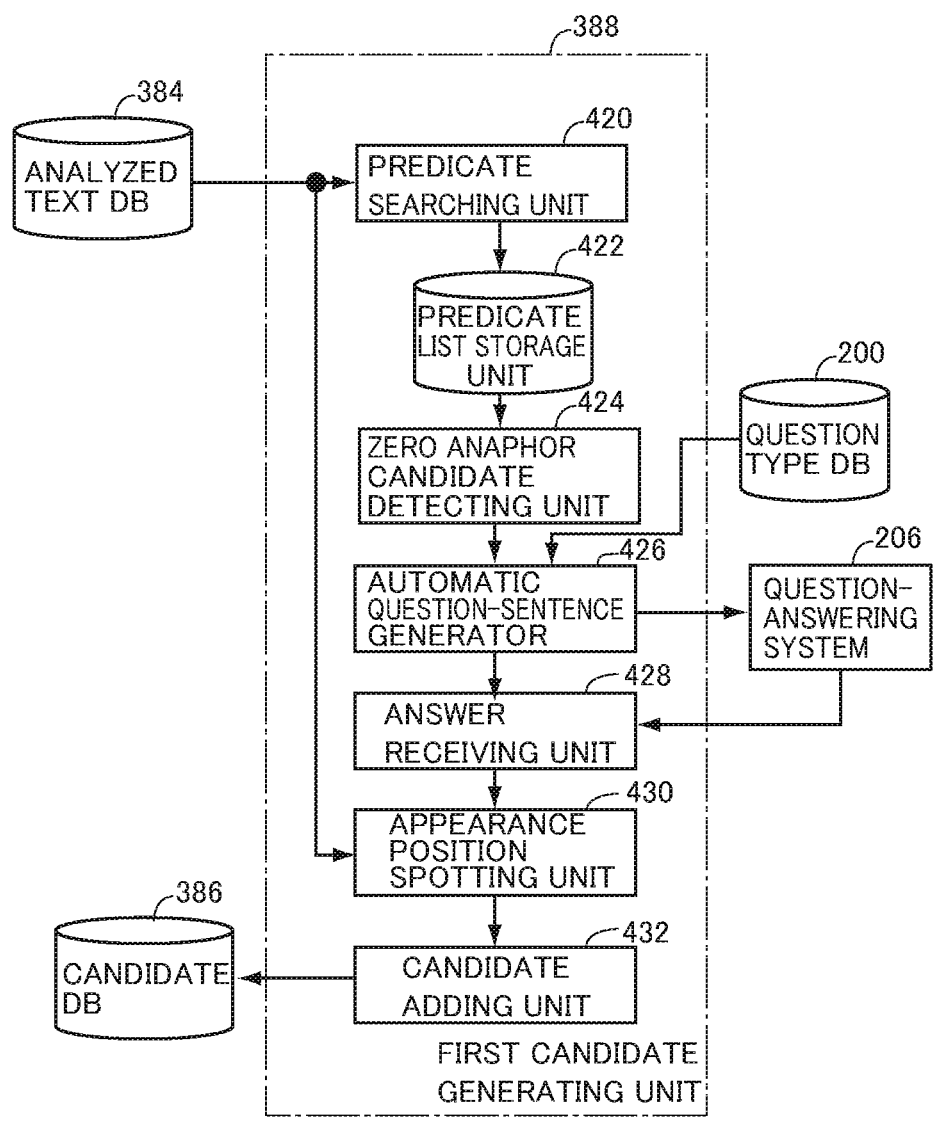
FIG. 9 is a block diagram of a first candidate generating unit generating annotation candidates.

Referring to FIG. 9, first candidate generating unit 388 includes: a predicate searching unit 420 searching for a predicate of each text data stored in analyzed text DB 384; a predicate list storage unit 422 storing a list of predicates output from predicate searching unit 420 with positions of appearance of respective predicates; zero anaphor candidate detecting unit 424 detecting, for each predicate stored in predicate list storage unit 422, an omitted portion or zero anaphor in a dependency relation in which the predicate is involved, and outputting it as a zero anaphor candidate; an automatic question-sentence generator 426 for generating, for each zero anaphor candidate output from zero anaphor candidate detecting unit 424, a question sentence asking as an answer a word that is an antecedent candidate for the zero anaphor with reference to question type DB 200, and giving the question sentence as an input to question-answering system 206: an answer receiving unit 428 receiving a question sentence from automatic question-sentence generator 426, and receiving a group of answer candidates to the question sentence from question-answering system 206, and outputting combinations of the question sentence and the group of answer candidates; an appearance position spotting unit 430, receiving the pairs of question sentence and answer candidates output from answer receiving unit 428, spotting positions of appearance of the candidates included in the group of answer candidates in the analyzed text stored in analyzed text DB 384, selecting all candidates that precedes the zero anaphor as the object of question, and outputting them as candidates of referred entity; and a candidate adding unit 432 for pairing a zero anaphor and a group of antecedent candidates of the zero anaphor, output from appearance position spotting unit 430, and adding the thus formed pairs as annotation candidates to candidate DB 386.

<Second Candidate Generating Unit 390>

Figure 10:
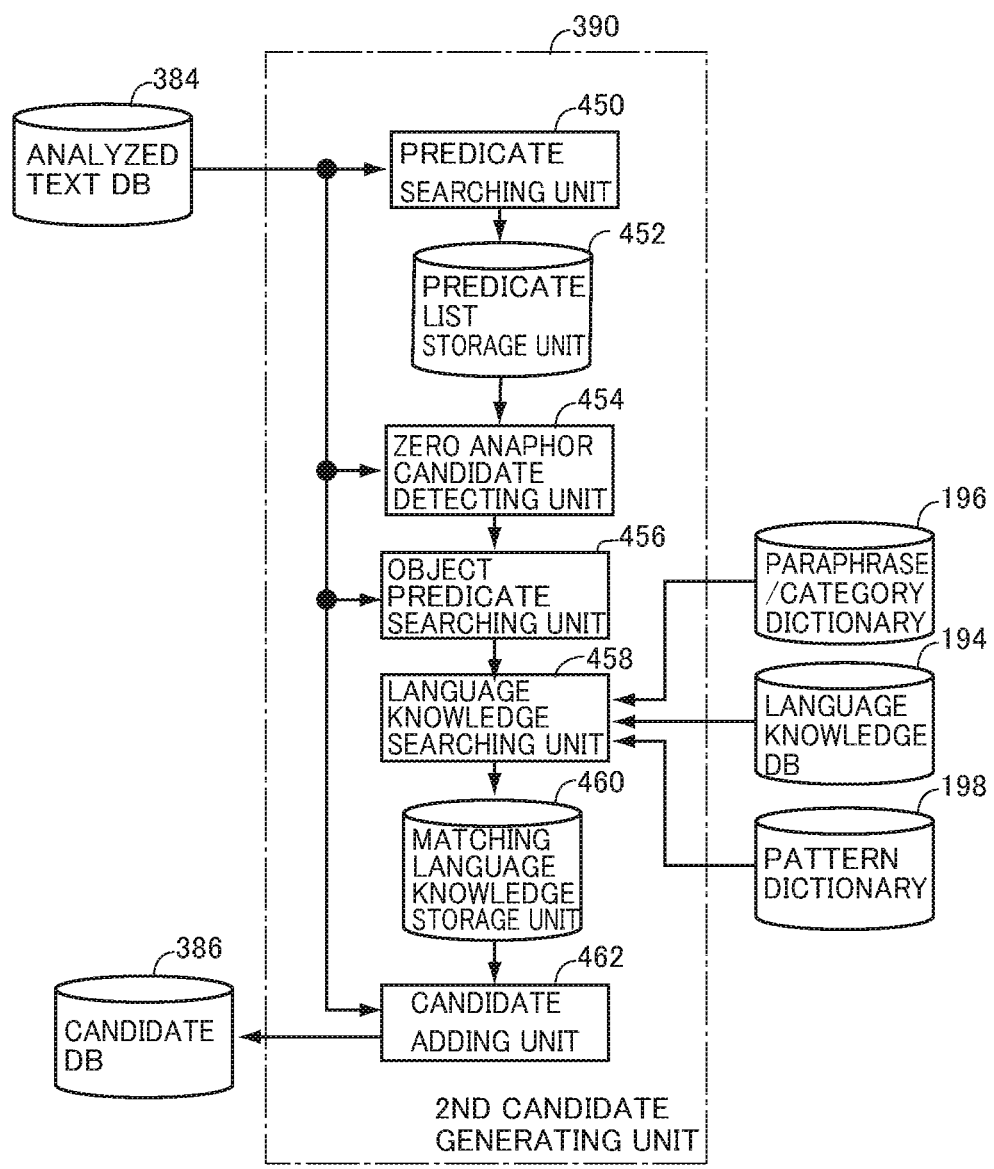
FIG. 10 is a block diagram of a second candidate generating unit generating annotation candidates.

Referring to FIG. 10, second candidate generating unit 390 includes a predicate searching unit 450, a predicate list storage unit 452 and a zero anaphor candidate detecting unit 454 which are similar to predicate searching unit 420, predicate list storage unit 422 and zero anaphor candidate detecting unit 424 shown in FIG. 9, respectively; an object predicate searching unit 456 searching, for each of the zero anaphor candidates detected by zero anaphor candidate detecting unit 454, for a predicate corresponding to the zero anaphor candidate, and one or more other predicates appearing in the text prior to this corresponding predicate, and outputting the predicate corresponding to the zero anaphor and each of the other predicates as pairs; a language knowledge searching unit 458 determining, for each pair of predicates output from object predicate searching unit 456, whether a piece of language knowledge in which the predicates forming the pair or predicates of equivalent expressions obtained by looking up paraphrase/category dictionary 196 appear in the first and second sentences, respectively, exists in language knowledge DB 194, or whether such patterns of expressions exist in pattern dictionary 198, and outputting such language knowledge or pattern, if any; a matching language knowledge storage unit 460 for temporarily storing language knowledge or pattern output from language knowledge searching unit 458; and a candidate adding unit 462 using language knowledge or pattern stored in matching language knowledge storage unit 460 and using expressions including each of the predicates of predicate pairs output from object predicate searching unit 456, for estimating an entity referred back to by each zero anaphor included in these expressions, forming a pair of each zero anaphor and the corresponding referred back entity, and storing the thus formed pairs as annotation candidates in candidate DB 386.

Figure 2:
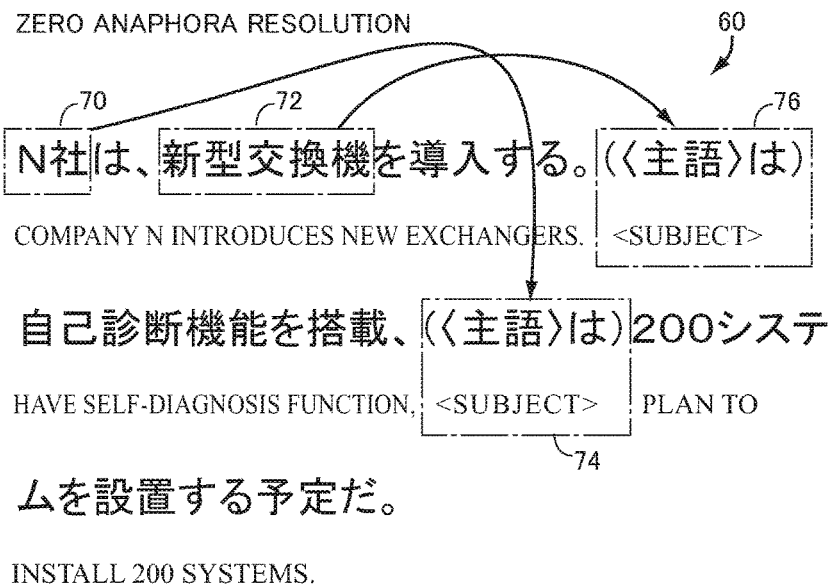
FIG. 2 is a schematic illustration showing zero anaphora resolution.

Estimation of an entity referred back to by a zero anaphor by candidate adding unit 462 is performed in the following manner. Referring to FIG. 11, for a certain predicate pair appearing in text 482 ([導入する] (introduce) of character sequence 494 and [設置する] (install) of character sequence 500), assume that language knowledge searching unit 458 has retrieved a piece of language knowledge 480. Text 482 is identical with example text 60 shown in FIG. 2. The piece of language knowledge 480 consists of the first sentence [X がYを導入する] (X introduces Y) and the second sentence [X がYを設置する] (X installs Y). In text 482, the expression that corresponds to the variable X in the first sentence is the character sequence [N 社は] (Company N) 490. The expression corresponding to the variable Y in the first sentence is the character sequence [新型交換機を] (new exchangers) 492 in text 482. Here, the expression [導入する] (introduce) in the first sentence of language knowledge 480 matches the character sequence 494, i.e., [導入する] (introduce) in text 482. From this relation, it can be understood that the candidate pointed to by the variable X is the word [N 社] (Company N) in character sequence 490, and the candidate pointed out by the variable Y is the word [新型交換機] (new exchangers) in character sequence 492.

On the other hand, the expression that appears in text 482 as an expression matching [設置する] (install) of the second sentence of language knowledge 480 is the character sequence 500 [設置する] (install) in [200システムを設置する] (install 200 systems). At the head of this expression, there is a tag added to indicate a zero anaphor 496. By comparing this sentence ([(<主語>)は 200システムを 設置する)] (<subject> installs 200 systems) with the second sentence of language knowledge 480, it can be understood that Y corresponds to [システム] (system) and X is omitted. Using the knowledge obtained from the first sentence of language knowledge 480, it can be seen that the zero anaphor 496 of text 482 refers to X of language knowledge 480 and, hence, the character sequence 490 [N社は] (Company N) is the subject of [設置する] (install). Further, it can also be seen that [システム] (system) in the second sentence of text 482 corresponds to the variable Y of language knowledge 480 and, therefore, the character sequence 492 [新型交換機 を] (new exchangers) in text 482 corresponds to the character sequence 498 [システム] (system) in text 482. In this manner, candidates of referred back entity of zero anaphor 496 can be found by the comparison between language knowledge 480 and the text.

Another example using the language knowledge will be described with reference to FIG. 12. In the process shown in this example, by successively concatenating two or more rules, continuous causal relations of three or more sentences can be obtained; and using the relations, candidates of referred back entities corresponding to two or more zero anaphora detected in relation to three or more predicates appearing in the text are specified.

A shown in FIG. 12, assume a first piece of language knowledge 520 [砂漠 化が進む → 黄砂が増える] (desertification proceeds→yellow dust increases) and a second piece of language knowledge 522 [黄砂が増える → 喘息が悪化する] (yellow dust increases→asthma worsens). The second sentence of first piece of language knowledge 520 matches the first sentence of second piece of language knowledge 522. Therefore, by concatenating these two pieces of knowledge, we can obtain a third piece of language knowledge 524 [砂漠化が進む → 黄砂が増える → 喘息が悪化する] (desertification proceeds→yellow dust increases→asthma worsens). The third piece of language knowledge 524 is compared, for example, with text 526 shown in FIG. 12, focusing particularly on predicates and the order of their appearances. Here, it is assumed that zero anaphora of text 526 has been estimated and tags are added to indicate zero anaphora 542, 548 and the like. In text 526, "(ø1)" represents a first zero anaphor and "(ø2)" represents a second zero anaphor, et seq. Then, it can be seen that in text 526, an expression 540 [砂漠化が進んでいて] (desertification proceeds), an expression 544 [(ø1) が増えている] ((ø1) is increasing) and an expression 546 [(ø2) 悪化して] (ø2 is worsening) appear in the same order as the three predicate portions of the third piece of language knowledge 524. The predicate portions of these expressions are the same as or inflected forms of the predicates of the third piece of knowledge 524. Therefore, by comparing the portions where these predicates appear in the third piece of knowledge 524 and in text 526, it can be found that ø1 refers to yellow dust and ø2 refers to asthma.

By such a comparison, pieces of knowledge obtained by concatenating two or more pieces of knowledge can be well utilized, and referred back entities corresponding to zero anaphora can be searched with higher efficiency. The extent to which the pieces of knowledge are to be concatenated is a design matter. When the knowledge becomes longer, the maximum number of referred back entities corresponding to zero anaphora that can be searched for by one piece of knowledge becomes larger, while the text to which the rule is applicable becomes fewer. The present embodiment contemplates concatenation of up to two pieces of knowledge. The present invention, however, is not limited to such an embodiment. A larger number of pieces of knowledge may be concatenated and used for searching for the referred back entities of zero anaphora. Alternatively, the maximum number of concatenations may be changed depending on types of sentences, or the user may designate the maximum number of concatenation of pieces of knowledge.

Referring to FIG. 13, an example of searching for a larger number of referred back entities based on one piece of knowledge by using paraphrase of a predicate in the language knowledge will be described. Assume that as a piece of knowledge, there is event occurrence order language knowledge 570 [X が生まれる→X を販売する] (X is produced→sell X). On the other hand, assume that a paraphrasing rule 574 that [販売する] (sell) is exchangeable with [売る] (market) is stored in paraphrase/category dictionary 196. Consider text 572 [ウィスキー『W』が北海 道で生まれA社が (ø ヲ) 販売した] (whisky "W" was produced in Hokkaido and Company A sold (ø)) as object text to be processed. The object text includes a zero anaphor 582 represented by (ø ヲ) "(ø)". By comparing the former half of text 572 and the first sentence of event occurrence order language knowledge 570, it can be understood that the variable X refers to the word 580 [ウィスキー『W』] (whisky "W") in text 572. On the other hand, the object of the predicate [販売する] (sell) in event occurrence order language knowledge 570 is X. From this result an the act that the predicate in the latter half of text 572 is the expression 584 [販売した] (sold), it can be understood that zero anaphor 582 represented by (ø ヲ) ("ø") in text 572 corresponds to the word 580 [ウィスキー『W』] (whisky "W"). Thus, first, text 572 with such an annotation is obtained. Further, in the text 572 thus obtained, [販売した] (sold) is replaced by an expression 586 [売った」] (marketed), by paraphrase 576 applying paraphrasing rule 574, while maintaining the annotation. Thus, a new annotated text 578 is obtained.

Figure 14:
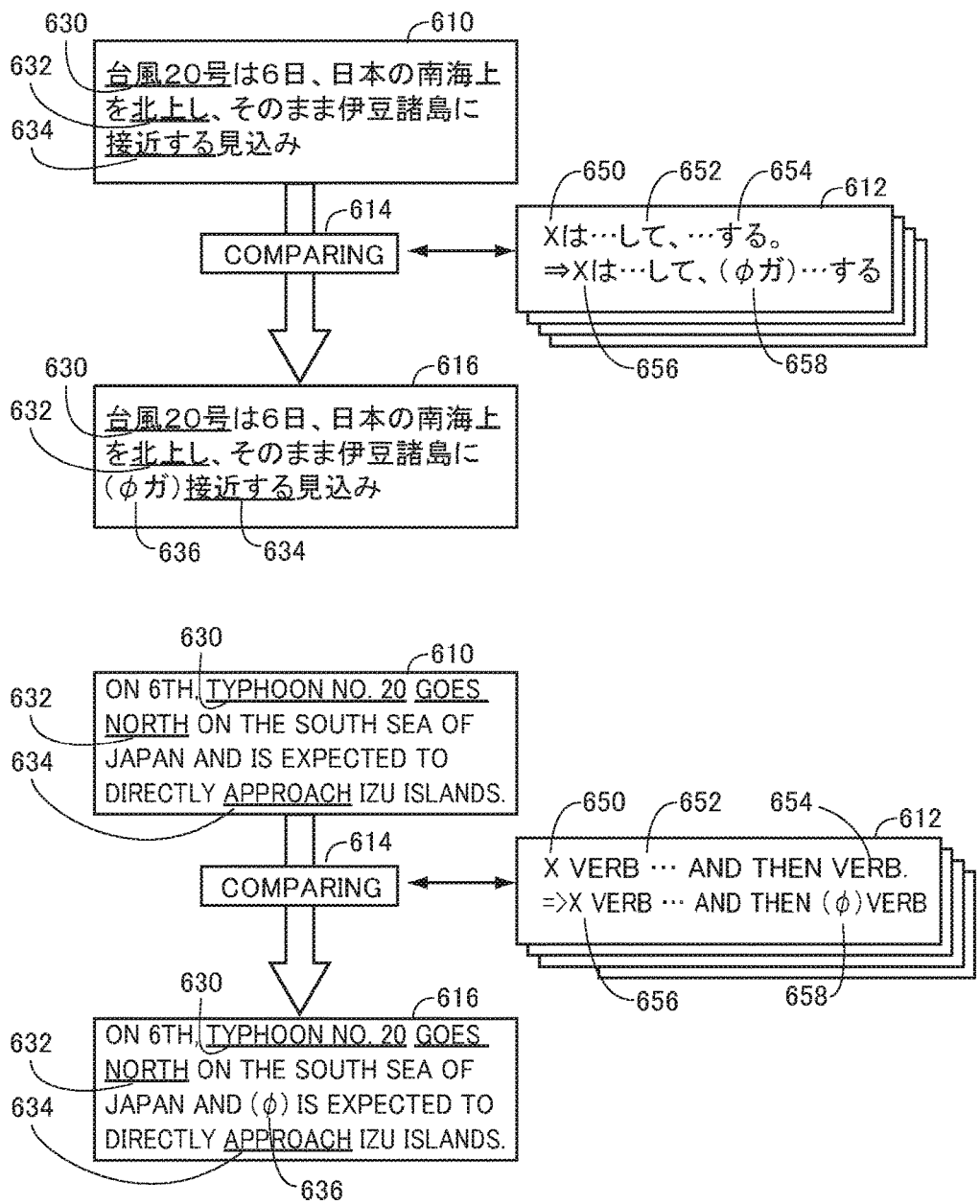
FIG. 14 is a diagram illustrating a process for generating an annotation candidate using the language knowledge.

Referring to FIG. 14, further, a process of identifying a referring back entity and/or referred back entity of a zero anaphor or anaphor using empirically obtained sentence patterns will be described. By way of example, when a pattern [X は〜し て、〜する] (X verb, and then verb) appears, it is empirically known that in most examples, the subject of [<述語>して] (verb) and the subject of [<述語>す る] (and then verb) are both X. This type of knowledge is stored as a grammatical pattern in pattern dictionary 198. In the pattern, information identifying a portion corresponding to a zero anaphor and information indicating the corresponding referred back entity may be inserted. If an expression that matches a pattern stored in pattern dictionary 198 appears in text that is being processed, by comparing the expression with the pattern, it is possible to identify the zero anaphor (referring back entity) in the input portion and to identify the referred back entity pointed to by the zero anaphor.

For instance, assume that a pattern 612 is stored in pattern dictionary 198 as shown in FIG. 14. This pattern 612 describes the following: when an expression 650 [X は] (X), an expression 652 [ . . . して] (verb) and an expression 654 [ . . . する] (and then verb) appear in this order, a tag 658 indicating a portion where the す subject of expression 654 is omitted is added to the head of expression 65, and that the referred back entity corresponding to tag 658 is X 656.

Now, assume that text 610 is given as an input. In text 610, an expression 630 [台風20号は] (Typhoon No. 20), an expression 632 [ . . . を北上し] (goes north) and an expression 634 [接近する] (is expected to directly approach) appear in this order. By comparing 614 this text 610 with pattern 612, it becomes clear that X corresponds to Typhoon No. 20, the subject of [接近する] (is expected to directly approach) is omitted, and the referred back entity is Typhoon No. 20. Thus, a tag 636 indicating a zero anaphor immediately preceding [接近する] (is expected to directly approach) and the corresponding referred back entity [台風20号] (Typhoon No. 20) are paired as an annotation candidate. In this manner, by adapting patterns derived from human experience to (zero-)anaphora resolution, (zero-)anaphora resolution well utilizing human knowledge can be realized.

<Third Candidate Generating Unit 392>

Figure 15:
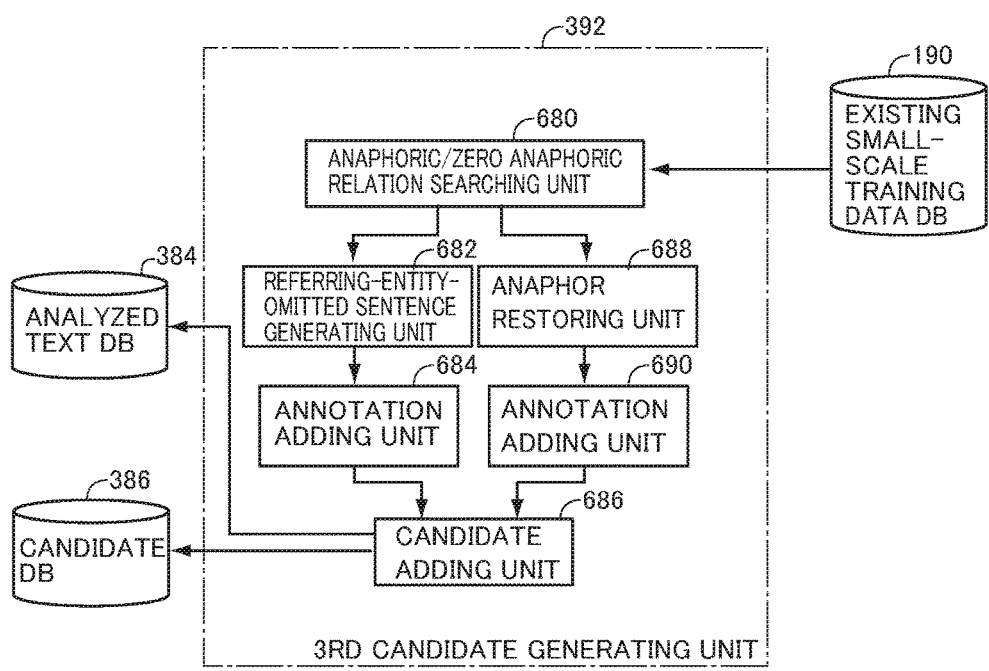
FIG. 15 is a block diagram of a third candidate generating unit generating annotation candidates.

Referring to FIG. 15, third candidate generating unit 392 includes: an anaphoric/zero anaphoric relation searching unit 680 searching for annotated anaphoric relation and zero anaphoric relation from existing small-scale training data DB 190 and outputting these relations distinguished from each other; a referring-entity-omitted sentence generating unit 682 generating, from each of the noun phrase pairs having anaphoric relations output from anaphoric/zero anaphoric relation searching unit 680, a new sentence having a referring back entity (one appearing later in the text) of the two noun phrases automatically omitted and thereby generating new text; an annotation adding unit 684 adding, to the sentences generated by referring-entity-omitted sentence generating unit 682, an annotation candidate representing a new zero anaphoric relation between the thus automatically omitted portion and the noun phrase that previously had an annotation of anaphoric relation with the omitted portion; an anaphor restoring unit 688 restoring as a pronoun, in text portions including zero anaphoric relation output from anaphoric/zero anaphoric relation searching unit 680, an element of referred back entity of each zero anaphor based on an annotation, and thereby generating a new sentence; an annotation adding unit 690 adding, to the new sentence generated by anaphor restoring unit 688, an annotation candidate consisting of the referring back entity of the pronoun restored by anaphor restoring unit 688 and the referred back entity; and a candidate adding unit 686 adding, to candidate DB 386, the new sentences generated by annotation adding units 684 and 690 together with their annotation candidates.

When a referring back entity is omitted by third candidate generating unit 392, the omission is done automatically by a machine in accordance with a certain standard. Therefore, it is possible that a human cannot determine what is referred back to by the omitted portion in the expression after the omission. In such a case, the corresponding annotation is added as a negative example, to the training data.

If the text output from anaphoric/zero anaphoric relation searching unit 680 and anaphor restoring unit 688 does not exist in analyzed text DB 384, candidate adding unit 686 adds the output text to analyzed text DB 384, and adds the annotation candidates to candidate DB 386 in association with the text added to analyzed text DB 384.

<Fourth Candidate Generating Unit 394>

Figure 16:
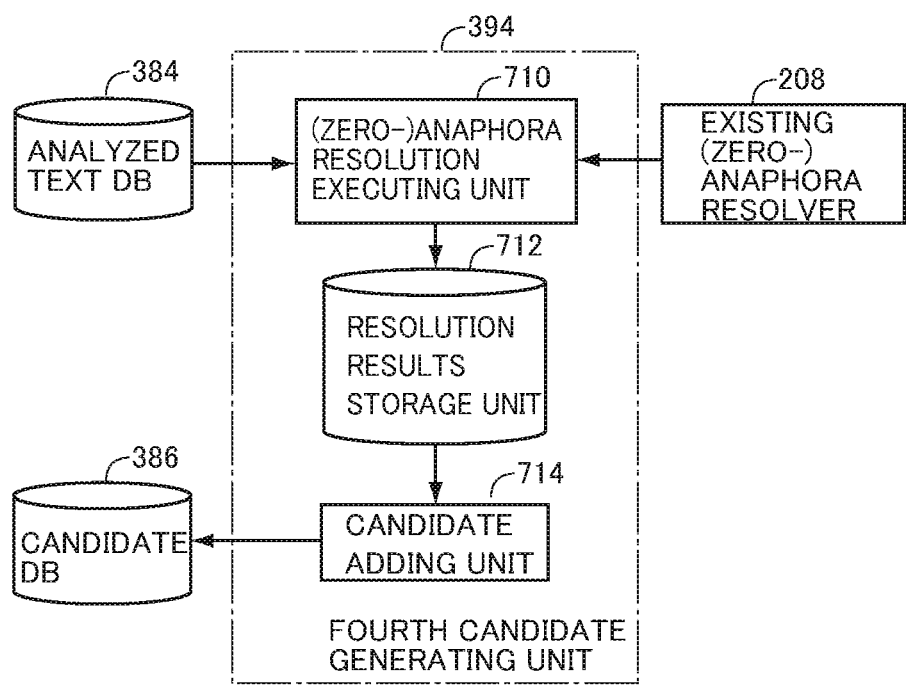
FIG. 16 is a block diagram of a fourth candidate generating unit generating annotation candidates.

Referring to FIG. 16, fourth candidate generating unit 394 includes: a (zero-)anaphora resolution executing unit 710 applying existing (zero-)anaphora resolver 208 to the analyzed text stored in analyzed text DB 384, thereby obtaining results of (zero-)anaphora resolution and adding the same as annotations to analyzed text; a resolution result storage unit 712 storing text having annotations of results of (zero-)anaphora resolution output from (zero-)anaphora resolution executing unit 710 added; and a candidate adding unit 714 adding annotations included in the resolution results stored in resolution result storage unit 712 to candidate DB 386 as annotation candidates to the text as the object of analysis in analyzed text DB 384.

<Interactive Annotation Device 396>

Figure 17:
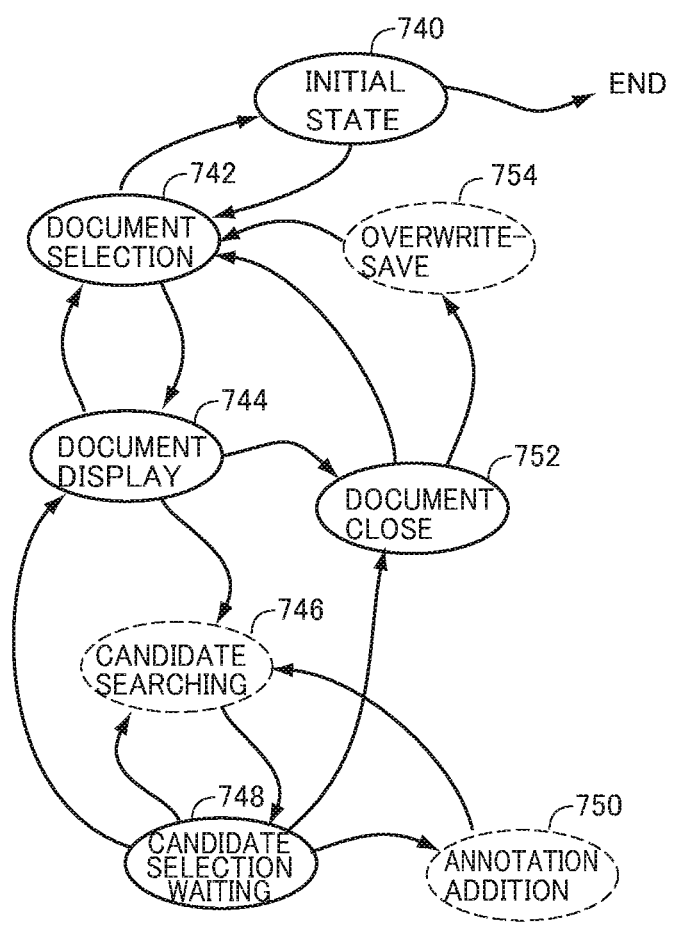
FIG. 17 is a state transition diagram of a program for generating training data by performing annotation to text through interaction with a user.

Interactive annotation device 396 shown in FIG. 8 is realized by a program that changes its states as shown in FIG. 17. Referring to FIG. 17, the program executes an initializing process at the start of program execution, at the time of closing a document and so on, and it starts from a state (initial state) 740 in which an initial screen image is displayed. In this state, a process of selecting a document as an object of processing from a text archive, or a process of terminating program execution can be selected. When one selects document selection, the program makes a state transition to a document selection state 742. In document selection state 742, a dialog allowing selection of a document file is displayed. Here, one can select a document file or cancel the process. When process cancellation is selected, the state returns to the initial state 740. If a document is selected in document selection state 742, the program makes a transition to a state displaying contents of the document (document display state) 744. In document display state 744, any of the following processes can be selected: a process of cancelling display of the document and returning to the document selection state 742 without reflecting any update; a process of updating and closing the document; and a process of instructing selection of an annotation candidate, in order to create training data for (zero-)anaphora resolution. When selection of an annotation candidate is instructed, the program makes a transition through a state of searching annotation candidate (candidate searching state) 746 searching candidates from a currently processed portion to the end of the document, to a state of displaying annotation candidates and waiting for selection of an annotation candidate by a user (candidate selection waiting state) 748.

In the candidate searching state 746, the next position having an annotation candidate or candidates added is searched. If there is only one annotation candidate added at the searched out position, as shown in the lower part of FIG. 3, a dropdown list allowing designation as to whether the annotation candidate is to be accepted or not is formed, and an icon "▼" to show the dropdown list is put on the object portion. If there is a plurality of annotation candidates, a dropdown list for showing all of them is formed, and the icon "▼" to show the dropdown list is put on the object portion. When the dropdown list is displayed and the user places a pointer on any item on the list, the candidate and the expression on the document corresponding to the candidate are high-lighted in the same color. By such a process, it becomes easier for the user to understand the correspondence between a referring back entity and a referred back entity. In this state, a process of interrupting the annotation selecting process and causing state transition to the document display state 744 or a process of updating the document with the annotations selected by that time, saving and closing the document can be selected.

When any of the candidates is selected by an operation on the dropdown list, the program makes a transition to an annotation addition state 750. In annotation addition state 750, the document in a memory is updated such that the selected annotation is added to a designated portion in the document as selected, and pieces of information indicating non-selection are added to other candidates. Then, the program again makes a transition to candidate searching state 746 and when the next candidate is found, makes a transition to candidate selection waiting state 748.

When interruption of annotation process is selected while the document is being displayed in the candidate selection waiting state 748, the program makes a transition to document display state 744. If saving the present document reflecting the annotation process is selected, the program makes a transition to a document close state 752. In the document close state 752, a process of overwrite-saving the updated document loaded on the memory and closing the open document, or a process of not saving the document and proceeding to document selection state 742 may be selected. If discarding the document is selected, the program makes a direct transition to document selection state 742. If saving the document is selected, the program makes a transition to a state 754 of overwriting the file on the memory as document file on a storage (overwrite-save state), and when saving is complete, makes a transition to document selection state 742.

By executing this program, zero anaphora and anaphora are automatically searched for on the side of the device, and every time an anaphor or zero anaphor is detected, an annotation candidate or candidates added to that portion are displayed. If there is one annotation candidate, the user may input whether the annotation candidate is to be accepted or not. In some situations, the user may manually input an annotation candidate. In any case, as compared with the approach in which a user visually searches for a zero anaphor or an anaphor and further visually searches for a referred back entity, the task of annotation becomes far easier.

<Detector Training Device 222>

Again referring to FIG. 4, detector training device 222 separately trains zero anaphor detector 166, anaphor detector 168 and antecedent identifier 170, respectively using selectional restriction DB 224, question type DB 220 and question-answering system 226, from the training data stored in training data DB 162, as described above. For antecedent identifier 170, an identifier for antecedents corresponding to zero anaphora and an identifier for antecedents corresponding to anaphora are separately trained.

Figure 18:
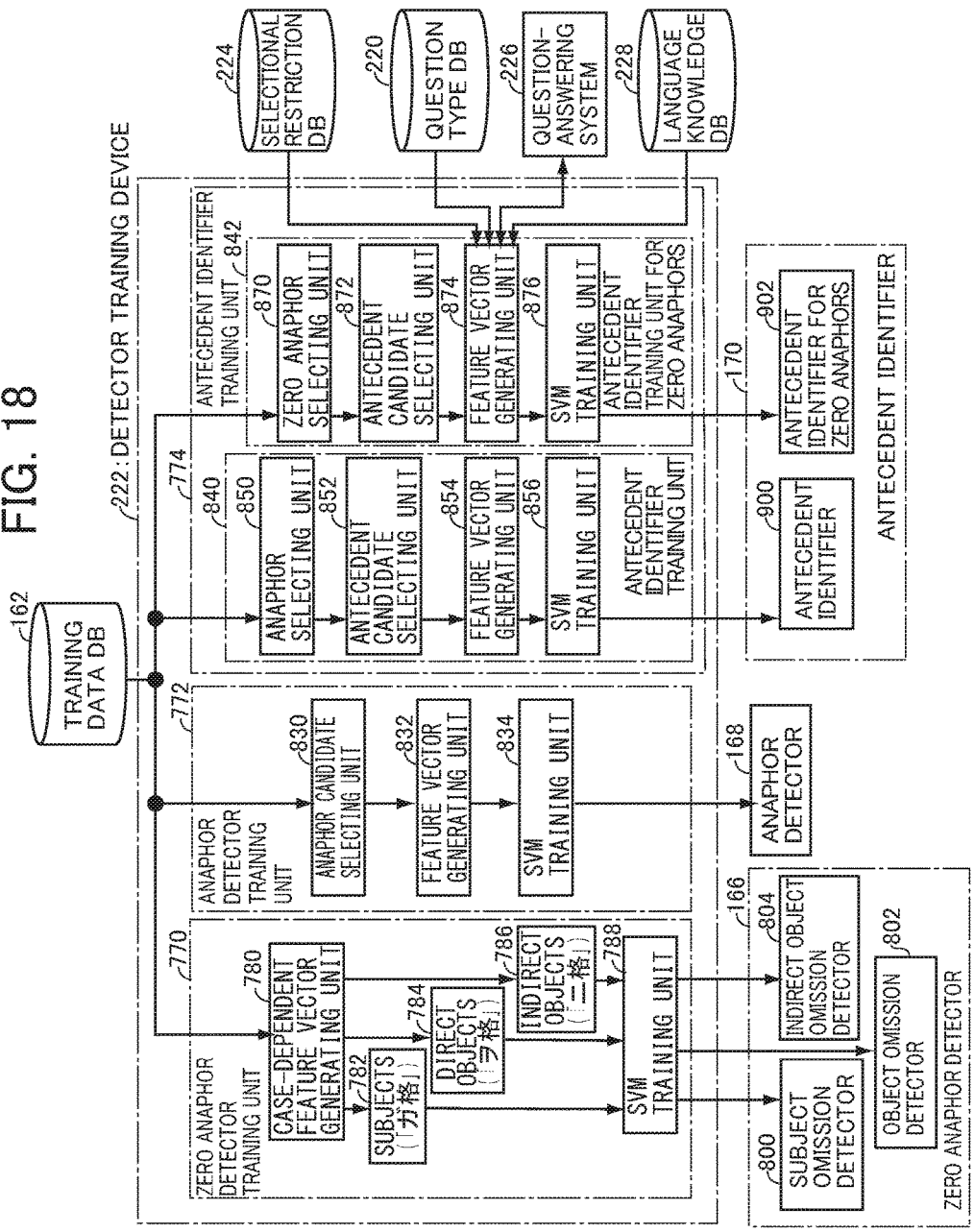
FIG. 18 is a detailed functional block diagram of a detector training device 222.

Referring to FIG. 18, for this purpose, detector training device 222 includes a zero anaphor detector training unit 770, an anaphor detector training unit 772 and an antecedent identifier training unit 774.

<Zero Anaphor Detector Training Unit 770>

In the present embodiment, zero anaphor detector 166 includes a subject omission detector 800, an object omission detector 802 and an indirect object omission detector 804. In order to separately train these three detectors, zero anaphor detector training unit 770 includes: a case-dependent feature vector generating unit 780 for classifying, when the zero anaphors in the training data stored in training data DB 162 are subjects (「ガ格」), direct objects (「ヲ格」) or indirect objects (「ニ格」), these and generating feature vector groups 782, 784 and 786 for training subject omission detector 800, object omission detector 802 and indirect object omission detector 804, respectively; and an SVM training unit 788 for training SVMs constituting subject omission detector 800, object omission detector 802 and indirect object omission detector 804, using these feature vector groups 782, 784 and 786, respectively.

Here, a predicate refers to a verb, an adjective or a character sequence in the form of [名詞+「だ」] (noun+DA). A feature vector has a training label of 1 if the predicate has a zero anaphor, and 0 if not.

The feature vectors generated by case-dependent feature vector generating unit 780 have the following elements:

1, if the grammatical role of the object of detection (for example, subject) has a dependency relation in connection with a predicate of which zero anaphor is to be detected, and 0, otherwise.

1, if an expression as a topic (a noun phrase marked by [は] (wa)) appears in the same sentence as the predicate, and 0, otherwise.

1, if the predicate of which zero anaphor is to be detected appears in the first sentence of text, and 0, otherwise.

1, if the predicate of which zero anaphor is to be detected is the first word of a sentence, and 0, otherwise.

An entry word and its part of speech, of a word having a dependency relation with the predicate of which zero anaphor is to be detected.

<Anaphor Detector Training Unit 772>

Anaphor detector training unit 772 includes: an anaphor candidate selecting unit 830 for selecting a word having an annotation as a referring back entity (anaphor) of anaphoric relation from the training data stored in training data DB 162, in order to perform training of SVM of anaphor detector 168; a feature vector generating unit 832 for generating such a feature vector as will be described later for each anaphor selected by anaphor candidate selecting unit 830; and an SVM training unit 834 for training the SVM constituting the anaphor detector 168 using the feature vectors generated by feature vector generating unit 832.

In the feature vectors generated by feature vector generating unit 832, the training label is 1, if a noun phrase as an object of classification has a referred back entity of anaphoric relation in preceding part of the text, and 0, otherwise. The feature vector for anaphor detection training includes the following elements:

Part of speech and entry word character sequence of an anaphor candidate, and case article following the candidate;

Part of speech and entry word of a referred back entity of the anaphor candidate, and case article following the referred back entity;

1, if a noun phrase appearing at a position preceding the anaphor candidate in the text perfectly matches as character sequence with the anaphor candidate, and 0, otherwise; and 1, if it partially matches with the anaphor candidate in the text, and 0, otherwise.

<Antecedent Identifier Training Unit 774>

Antecedent identifier 170 includes an antecedent identifier 900 and an antecedent identifier for zero anaphors 902. Therefore, antecedent identifier training unit 774 is configured to separately train these two identifiers 900 and 902.

Specifically, antecedent identifier training unit 774 includes: an antecedent identifier training unit 840 for training antecedent identifier 900; and an antecedent identifier training unit for zero anaphors 842 for training antecedent identifier for zero anaphors 902.

Antecedent identifier training unit 840 includes: an anaphor selecting unit 850 for selecting, from the training data stored in training data DB 162, an expression annotated as a referring back entity (anaphor) of anaphoric relation; an antecedent candidate selecting unit 852 for selecting, for the anaphor selected by anaphor selecting unit 850, antecedent candidates consisting of one actually annotated as an antecedent and other expressions as possible antecedents; a feature vector generating unit 854 for generating, for each combination of the anaphor selected by anaphor selecting unit 850 and each of the antecedent candidates selected by antecedent candidate selecting unit 852, a feature vector for training antecedent identifier 900; and an SVM training unit 856 for training the SVM constituting antecedent identifier 900 using the feature vector generated by feature vector generating unit 854.

On the other hand, antecedent identifier training unit for zero anaphors 842 includes: a zero anaphor selecting unit 870 for selecting an expression annotated as a zero anaphoric relation from the training data stored in training data DB 162; an antecedent candidate selecting unit 872 for selecting antecedent candidates consisting of an expression annotated as an antecedent, for the zero anaphor selected by zero anaphor selecting unit 870, and other expressions as possible antecedents, from the training data; a feature vector generating unit 874 for generating a feature vector for each combination of the zero anaphor selected by zero anaphor selecting unit 870 and each of the antecedent candidates selected by antecedent candidate selecting unit 872; and an SVM training unit 876 for training the SVM constituting antecedent identifier for zero anaphors 902 using the feature vectors generated by feature vector generating unit 874. As will be described later, feature vector generating unit 874 is connected to selectional restriction DB 224, question type DB 220, question-answering system 226 and language knowledge DB 228, and it uses pieces of information obtained from these when generating the feature vector.

The feature vectors generated by feature vector generating units 854 and 874 have a training label that is 1, if the zero anaphor/antecedent candidate pair or anaphor/antecedent candidate pair to be classified has the anaphoric/zero anaphoric relation, and 0, otherwise.

The feature vector elements are as follows:

Part of speech and entry word character sequence of an antecedent candidate, and case article following the candidate;

1, if the antecedent candidate appears in the first sentence of the text, and 0, otherwise;

1, if the antecedent candidate is an antecedent candidate first mentioned in the sentence, and 0, otherwise;

1, if the antecedent candidate and the anaphor have perfectly matching character sequence, and 0, otherwise;

1, if the antecedent candidate and the anaphor have partially matching character sequence, and 0, otherwise;

1, if a selectional restriction is satisfied between a predicate having a zero anaphor and a noun phrase to be the antecedent, and 0, otherwise using selectional restriction DB 224;

1, if any of the answers from question-answering system 226 in response to a question matches the precedent candidate, where the question is generated by using question type DB 220 for the sentence with a zero anaphor at a certain portion so that the portion will be the answer to that question, and 0, otherwise; and 1, if a predicate having the zero anaphor and a predicate referring back to the antecedent matches a pair of predicates included in causal knowledge registered with detector training device 222, and 0 otherwise.

<(Zero-)Anaphora Resolution Device 172>

Referring to FIG. 4, (zero-)anaphora resolution device 172 includes: a (zero-)anaphora resolver 252 connected to zero anaphor detector 166, anaphor detector 168 and antecedent identifier 170, for performing (zero-)anaphora resolution on an input 250 using these, and for automatically adding an annotation to input 250 and thereby providing an output 254; and language knowledge DB 256, question type DB 258, question-answering system 260 and selectional restriction DB 262 used by (zero-)anaphora resolver 252 to generate feature vectors during (zero-)anaphora resolution. Language knowledge DB 256 is a database storing language knowledge similar to language knowledge DB 194 used in (zero-)anaphora resolution system 150 and language knowledge DB 228 used in training system 164. Question type DB 258 has the similar configuration as those of question type DB 200 used in annotation data generation assisting system 160 and question type DB 220 used in training system 164, and stores similar contents. Question-answering system 260 is a system having the similar function as question-answering system 206 used in annotation data generation assisting system 160 and question-answering system 226 used in training system 164. Selectional restriction DB 262 is similar to selectional restriction DB 224 used in feature vector generation for training system 164 when generating feature vectors. Here, DBs described as having similar configurations may be the same as or different from each other.

[Operation]

(Zero-)anaphora resolution system 150 having such a configuration as described above operates in the following manner. In the following description, the operation will be divided to three phases: generation of training data; training of detectors; and automatic annotation to inputs.

<Generation of Training Data>

Generation of training data is performed by annotation data generation assisting system 160. Prior to this process, it is necessary to prepare existing small-scale training data DB 190, text archive 192, language knowledge DB 194, paraphrase/category dictionary 196, pattern dictionary 198, existing (zero-)anaphora resolver 208 and question type DB 200. Further, as to question-answering system 206, it is necessary to prepare the question-answering system in annotation data generation assisting system 160 in advance to be accessible from training data generation assisting device 204, or it is necessary to have an external question-answering system ready to receive a question sentence.

Referring to FIG. 8, the user activates training data generation assisting device 204, designates text archive 192 and instructs start of training data generation. Morphological analysis system 380 reads each text stored in text archive 192, performs morphological analysis and gives sequences of morphemes having various pieces of grammatical information added, to dependency parsing system 382. Dependency parsing system 382 performs syntactic parsing and dependency parsing on each of the sentences consisting of the given sequences of morphemes, and outputs sequences of morphemes having syntactic information and dependency information added, to analyzed text DB 384. Thus, each text stored in text archive 192 is analyzed, and analyzed text is accumulated in analyzed text DB 384.

Referring to FIG. 9, predicate searching unit 420 of first candidate generating unit 388 reads each analyzed text stored in analyzed text DB 384, searches for a predicate and writes the predicates to predicate list storage unit 422. Zero anaphor candidate detecting unit 424 determines, for each predicate in the predicate list accumulated in predicate list storage unit 422, whether any of subject, object and indirect object of the predicate exists in a dependency relation including the predicate, and if none of them exist, detects the corresponding portion as a zero anaphor candidate and gives the same to automatic question-sentence generator 426. Automatic question-sentence generator 426 generates a question sentence of which answer will be the portion of zero anaphor candidate. At this Lime, automatic question-sentence generator 426 accesses question type DB 200 using the predicate that is being processed and the grammatical role (subject, object, etc.) of zero anaphor candidate as a key, and reads a question type. Automatic question-sentence generator 426 further uses expressions of read question type to generate such a question sentence as represented by question sentence 336 shown in FIG. 7, by modifying a sentence including a zero anaphor. Automatic question-sentence generator 426 gives this question sentence to question-answering system 206 and answer receiving unit 428. Receiving the question sentence from automatic question-sentence generator 426, answer receiving unit 428 waits until answers to the question sentence are given from question-answering system 206.

In the present embodiment, in response to a given question sentence, question-answering system 206 generates a plurality of answer candidates for each of a plurality of categories, and gives these candidates to answer receiving unit 428. Upon receiving the answer candidates from question-answering system 206, answer receiving unit 428 identifies the question sentence transmitted from automatic question-sentence generator 426 the answer candidates correspond to, and gives the answer candidates and information specifying the predicate that is being processed to appearance position spotting unit 430.

Based on the information from answer receiving unit 428, appearance position spotting unit 430 identifies positions of referred back entity candidates of the zero anaphor that appear earlier than the predicate as the object of processing in the analyzed text being processed, selects those positions as antecedent candidates for the zero anaphor, forms pairs of the predicate as the object of processing and each of the antecedent candidates, and outputs the results to candidate adding unit 432. Candidate adding unit 432 adds the candidates applied from appearance position spotting unit 430 to candidate DB 386.

Referring to FIG. 10, second candidate generating unit 390 operates in the following manner. Predicate searching unit 450 searches for each predicate in the analyzed text stored in analyzed text DB 384, and accumulates the predicates in predicate list storage unit 452. Similar to zero anaphor candidate detecting unit 424 shown in FIG. 8, for each predicate in the predicate list stored in predicate list storage unit 452, zero anaphor candidate detecting unit 454 determines whether any of subject, object and indirect object of the predicate exists in a dependency relation including the predicate, and if none of them exist, detects the corresponding portion as a zero anaphor candidate. Zero anaphor candidate detecting unit 454 gives information indicating the positions of the thus-detected zero anaphor candidates to object predicate searching unit 456. For each of the zero anaphor candidates detected by zero anaphor candidate detecting unit 454, object predicate searching unit 456 searches for predicates other than the predicate having the zero anaphor candidate and appearing earlier in the text than the corresponding predicate, forms pairs of each of the searched predicates and the predicate having the zero anaphor candidate, and applies the pairs to language knowledge searching unit 458.

For each pair of predicates output from object predicate searching unit 456, language knowledge searching unit 458 determines whether a piece of language knowledge in which the predicates forming the pair or predicates of equivalent paraphrased expressions appear in first and second sentences, respectively, exists in language knowledge DB 194, and outputs such language knowledge, if any. Language knowledge searching unit 458 also determines whether an expression including a predicate pair output from object predicate searching unit 456 and matching any of patterns stored in pattern dictionary 198 exists or not, and outputs such expressions, if any. When such language knowledge and patterns are to be applied to text, language knowledge searching unit 458 uses paraphrase rules and categories stored in paraphrase/category dictionary 196, to paraphrase expressions in the rules to other expressions, or replace words in the rules with other words, so that the applicable scope of language knowledge is made wider. The language knowledge retrieved by language knowledge searching unit 458 is accumulated, together with the pair of predicates used for searching for the language knowledge, in matching language knowledge storage unit 460. Finally, as described with reference to FIGS. 11 to 14, candidate adding unit 462 compares the predicate pair stored in matching language knowledge storage unit 460 with the matching language knowledge or pattern, thereby identifies referred back entity candidates of a zero anaphor candidate, and adds the pairs of zero anaphor candidate and each referred back entity candidate as annotation candidates to candidate DB 386.

Referring to FIG. 15, anaphoric/zero anaphoric relation searching unit 680 of third candidate generating unit 392 searches existing small-scale training data DB 190 for annotated anaphoric relation and anaphoric relation and outputs sentences including anaphoric relation to referring-entity-omitted sentence generating unit 682 and outputs sentences including anaphoric relation to anaphor restoring unit 688, respectively.

Referring-entity-omitted sentence generating unit 682 searches the text including anaphoric relation for pairs of noun phrases forming the anaphoric relation; for each such pair, generates a new text by automatically omitting a referring back entity that appears in the latter one of the two noun phrases in the text; and gives the generated new text to annotation adding unit 684. To the sentences generated by referring-entity-omitted sentence generating unit 682, annotation adding unit 684 adds an annotation candidate representing a new zero anaphoric relation between the omitted portion, and the noun phrase that was previously annotated as having an anaphoric relation with the omitted portion, and outputs the result to candidate adding unit 686.

In text including zero anaphoric relation output from anaphoric/zero anaphoric relation searching unit 680, candidate adding unit 686 restores an element of referred back entity for a zero anaphor as a pronoun based on an annotation, thereby generates new text, and gives the same to annotation adding unit 690. To the new text generated by anaphor restoring unit 688, annotation adding unit 690 adds an annotation candidate of a new anaphoric relation consisting of the referring back entity as a pronoun restored by anaphor restoring unit 688 and the portion indicated to be the referred back entity by the original annotation, and outputs to candidate adding unit 686.

Candidate adding unit 686 adds the text output from annotation adding units 684 and 690 to candidate DB 386, together with the annotation candidates added thereto.

Referring to FIG. 16, (zero-)anaphora resolution executing unit 710 of fourth candidate generating unit 394 reads text from analyzed text DB 384 and performs (zero-)anaphora resolution by existing (zero-)anaphora resolver 208. Though its performance is limited, existing (zero-)anaphora resolver 208 executes (zero-)anaphora resolution on the input text, and returns annotated text to (zero-)anaphora resolution executing unit 710. (Zero-)anaphora resolution executing unit 710 accumulates the annotated results of analysis in resolution result storage unit 712. Candidate adding unit 714 adds annotations included in the resolution results stored in resolution result storage unit 712 as annotation candidates, to candidate DB 386.

The above-described process is executed on every text stored in text archive 192 (see FIGS. 4 and 8), and eventually, text having annotation candidates added will be stored in candidate DB 386. The text stored in candidate DB 386 includes zero anaphor candidates and anaphor candidates; and each zero anaphor candidate and each anaphor candidate have one or a plurality of annotation candidates indicating corresponding referred back entities added thereto.

For each of the candidates stored in candidate DB 386, interactive annotation device 396 operates in the following manner, for each of the zero anaphor candidates and the anaphor candidates, using interactive process with the user through input/output device 202.

Referring to the lower part of FIG. 3, interactive annotation device 396 displays text 92 including an annotation candidate on a screen. Here, interactive annotation device 396 forms a dropdown menu allowing selection of an annotation candidate in the following manner, for each of the zero anaphor candidates and the anaphor candidates. Specifically, if there is only one referred back entity of the zero anaphor candidate, a word that is the same as the word 110 as the referred back entity candidate is displayed at the position of zero anaphor candidate indicated by character sequence 130 in FIG. 3, and an icon "▼" to indicate presence of the dropdown menu is put on the right side. The dropdown menu displays two options: one is (YES, NO) asking whether the displayed candidate is to be accepted or not, and the other is an option allowing direct manual input. When the user selects "YES", the selected annotation is established as the annotation. If "NO" is selected, the annotation is left un-established. When direct manual input is selected, a dialog allowing direct designation of referred back entity of the zero anaphor candidate indicated by character sequence 130 is displayed. When the user inputs a referred back entity, a new annotation is generated in accordance with the user's designation, and it becomes the established annotation. Here, the annotation displayed at first but not selected by the user is used for generating a negative example for forming feature vectors at the time of training. Thus, a flag indicating that it is a negative example is added to this annotation candidate.

If there is a plurality of annotation candidates, a dropdown list including the plurality of annotation candidates as options is generated. At the corresponding portion, the first of the annotation candidates, or an annotation candidate having the highest score with the annotation candidates scored in some way or another is displayed. The icon "▼" to indicate presence of the dropdown list is put on the right side. Here again, an option item allowing selection of direct manual input is displayed. When the user selects any of the options, the selected annotation candidate is established as the annotation. The non-selected candidates are used for generating negative examples for forming feature vectors at the time of training.

In any case, the analyzed text with annotations established is accumulated in training data DB 162. When the selection of annotation described above is completed for every analyzed text stored in candidate DB 386, training data DB 162 is complete.

<Training of Detectors>

Referring to FIG. 18, detector training device 222 operates in the following manner. Case-dependent feature vector generating unit 780 of zero anaphor detector training unit 770 reads training data including zero anaphora from the annotation-established training data stored in training data DB 162. When the zero anaphora in the training data are subjects (「ガ格」), direct objects (「ヲ格」) or indirect objects (「ニ格」) of a predicate, case-dependent feature vector generating unit 780 classifies them, generates feature vector groups 782, 784 and 786 and stores them in a storage device, not shown. Here, case-dependent feature vector generating unit 780 sets training label to 1 for an established annotation, and 0 for other annotations. Using these feature vector groups 782, 784 and 786, SVM training unit 788 trains SVMs of subject omission detector 800, object omission detector 802 and indirect object omission detector 804.

Anaphor candidate selecting unit 830 of anaphor detector training unit 772 reads text including anaphor candidates from the training data stored in training data DB 162, and selects annotated words as referring back entities (anaphors) of anaphoric relation. Feature vector generating unit 832 generates the above-described feature vector for each of the anaphor candidates selected by anaphor candidate selecting unit 830. Here, feature vector generating unit 832 sets training label to 1 for an established annotation, and 0 to other annotations. The feature vectors generated by feature vector generating unit 832 are accumulated in a storage device, not shown. SVM training unit 834 trains the SVM constituting the anaphor detector 168 using the group of feature vectors accumulated in this manner.

In antecedent identifier training unit 774, antecedent identifier training unit 840 operates in the following manner. Anaphor selecting unit 850 in antecedent identifier training unit 840 selects an expression having an annotation as a referring back entity (anaphor) of anaphoric relation from the training data stored in training data DB 162, and gives the same to antecedent candidate selecting unit 852. For the anaphor selected by anaphor selecting unit 850, antecedent candidate selecting unit 852 selects antecedent candidates consisting of an expression actually annotated as an antecedent and other expressions as possible antecedents (noun phrases). For each combination of the anaphor selected by anaphor selecting unit 850 and each of the antecedent candidates selected by antecedent candidate selecting unit 852, feature vector generating unit 854 generates a feature vector for training antecedent identifier 900. Here, feature vector generating unit 854 sets training label to 1 for expressions annotated as referred back entity of anaphora in anaphoric relation, and 0 for others. SVM training unit 856 trains the SVM constituting antecedent identifier 900 using the feature vectors generated by feature vector generating unit 854.

On the other hand, an antecedent identifier training unit for zero anaphors 842 operates in the following manner. From the training data stored in training data DB 162, zero anaphor selecting unit 870 in antecedent identifier training unit for zero anaphors 842 selects an expression (zero anaphor) annotated as a zero anaphoric relation, and gives the same to antecedent candidate selecting unit 872. Antecedent candidate selecting unit 872 selects possible antecedent candidates for zero anaphoric relation including an expression annotated as an antecedent for the zero anaphor selected by zero anaphor selecting unit 870 from the training data. Feature vector generating unit 874 generates a feature vector for each combination of the zero anaphor selected by zero anaphor selecting unit 870 and each of the antecedent candidates selected by antecedent candidate selecting unit 872, and accumulates in a storage device, not shown. In the feature vector generated by feature vector generating unit 874, the training label is 1, if the pair of zero anaphor/antecedent candidate as the object of classification has zero anaphoric relation, and 0, otherwise. Further, in generating feature vectors, feature vector generating unit 874 uses selectional restriction DB 224, question type DB 220, question-answering system 226 and language knowledge DB 228, as described above. SVM training unit 876 trains the SVM constituting antecedent identifier for zero anaphors 902 using the feature vectors generated by feature vector generating unit 874.

By the processes described above, training of subject omission detector 800, object omission detector 802 and indirect object omission detector 804 each included in zero anaphor detector 166, and anaphor detector 168, as well as antecedent identifier 900 and antecedent identifier for zero anaphors 902 included in antecedent identifier 170 is completed.

<Automatic Annotation>

Returning to FIG. 4, the (zero-)anaphora resolution on the input 250 by (zero-)anaphora resolver 252 and automatic annotation to the results are executed in the following manner. Here, the analysis is divided into zero anaphor analysis, anaphor analysis, and antecedent analysis for zero anaphor and anaphor. For zero anaphora resolution, zero anaphor detector 166 is used. For anaphora resolution, anaphor detector 168 is used. For antecedent identification, antecedent identifier 170 is used.

First, morphological analysis and syntactic/dependency parsing on input 250 are executed, and a sequence of morphemes having syntactic/dependency information added becomes the object of processing. In zero anaphor analysis, for the sequence of morphemes, feature vectors having the similar configurations as those for training subject omission detector 800, object omission detector 802 and indirect object omission detector 804 shown in FIG. 18 are generated and applied to these detectors. By the outputs from subject omission detector 800, object omission detector 802 and indirect object omission detector 804, annotations as zero anaphora are added to those portions having the highest scores in input 250. In anaphor analysis, words/phrases as possible anaphor candidates are selected from noun phrase pairs included in input 250, and for each of these, a feature vector having the same configuration as the feature vector generated by feature vector generating unit 832 shown in FIG. 18 is generated from input 250. By applying the feature vector to anaphor detector 168, a score is obtained from anaphor detector 168. Whether it is an anaphor or not is determined in accordance with the score, and an annotation to that effect is added.

Estimation of antecedent by antecedent identifier 900 is done in the following manner. For each of the expressions determined to be an anaphor by anaphor detector 168, expressions as possible antecedents are selected from input 250, and the anaphor expression and each possible antecedent are paired from which a feature vector is generated in the similar manner as done by feature vector generating unit 854 shown in FIG. 18. The feature vectors are input to antecedent identifier 900 and scores are obtained from antecedent identifier 900. An annotation of anaphoric relation is added between the anaphor as the object of processing and the antecedent candidate having the highest score that is not lower than a threshold value.

Estimation of antecedent by antecedent identifier for zero anaphors 902 is done in the similar manner. It is noted, however, that the feature vectors used are not those generated by feature vector generating unit 854 but feature vectors having the configurations similar to those generated by feature vector generating unit 874. Therefore, at this time, selectional restriction DB 224, question type DB 220, question-answering system 226 and language knowledge DB 228 are necessary.

As described above, by the present embodiment, training data for training detectors for (zero-)anaphora resolution can easily be generated from the text archive. By way of example, candidates of anaphoric/zero anaphoric relations are automatically searched for, and antecedent candidates thereof are displayed in the form of a list. What the user has to do is simply to accept a candidate if the list shows one and correct candidate, or to select one if the list shows a plurality of candidates. Different from the conventional approach, it is unnecessary for the user to visually search for positions of anaphoric/zero anaphoric relations, then visually search for positions referred back to, and further to add annotations of anaphoric/zero anaphoric relations to the two corresponding positions. If the displayed list does not include a correct referred back entity, it is possible to designate a correct referred back entity by direct manual input.

Therefore, the training data for training the detectors for (zero-)anaphora resolution can be created in a far easier manner than the conventional approaches. As a result, both the cost and time for generating the training data can be reduced. Since a huge amount of training data can be created at a low cost, it becomes possible to perform (zero-)anaphora resolution of text efficiently, using zero anaphor detector 166, anaphor detector 168 and antecedent identifier 170 trained by using the thus created training data. Further, as the amount of training data can be significantly large, higher precision of these detectors is expected. Thus, (zero-)anaphora resolution of text can almost automatically be done with high precision.

Though a single question-answering system 206 has been described in the embodiment above, the present invention is not limited to such an embodiment. If available, a plurality of question-answering systems may be used. In that case, if each of the question-answering system accepts natural language text as inputs, answer candidates can be obtained by simply transmitting the same question sentence to these systems.

[Computer Implementation]

Figure 19:
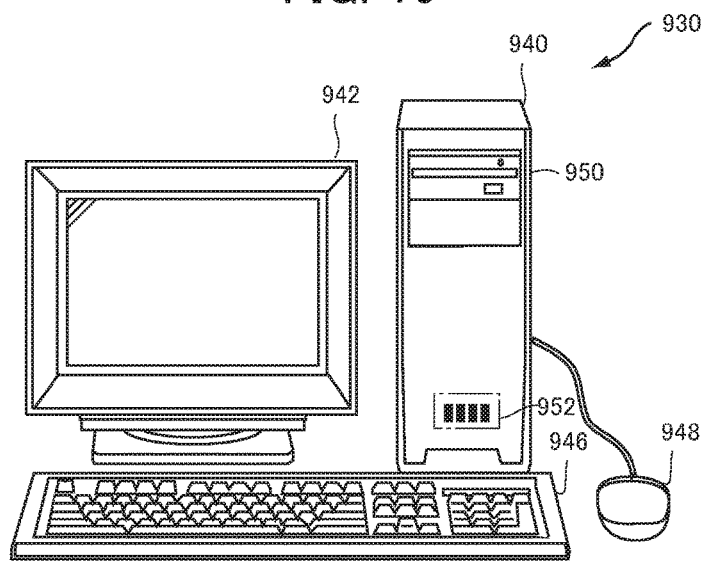
FIG. 19 shows an appearance of a computer executing the program for generating training data.

The training data generation assisting device 204 in accordance with the embodiments above can be implemented by computer hardware and computer programs executed on the computer hardware. FIG. 19 shows an appearance of computer system 930 and FIG. 20 shows an internal configuration of computer system 930.

Referring to FIG. 19, computer system 930 includes a computer 940 having a memory port 952 and a DVD (Digital Versatile Disk) drive 950, a keyboard 946, a mouse 948, and a monitor 942.

Figure 20:
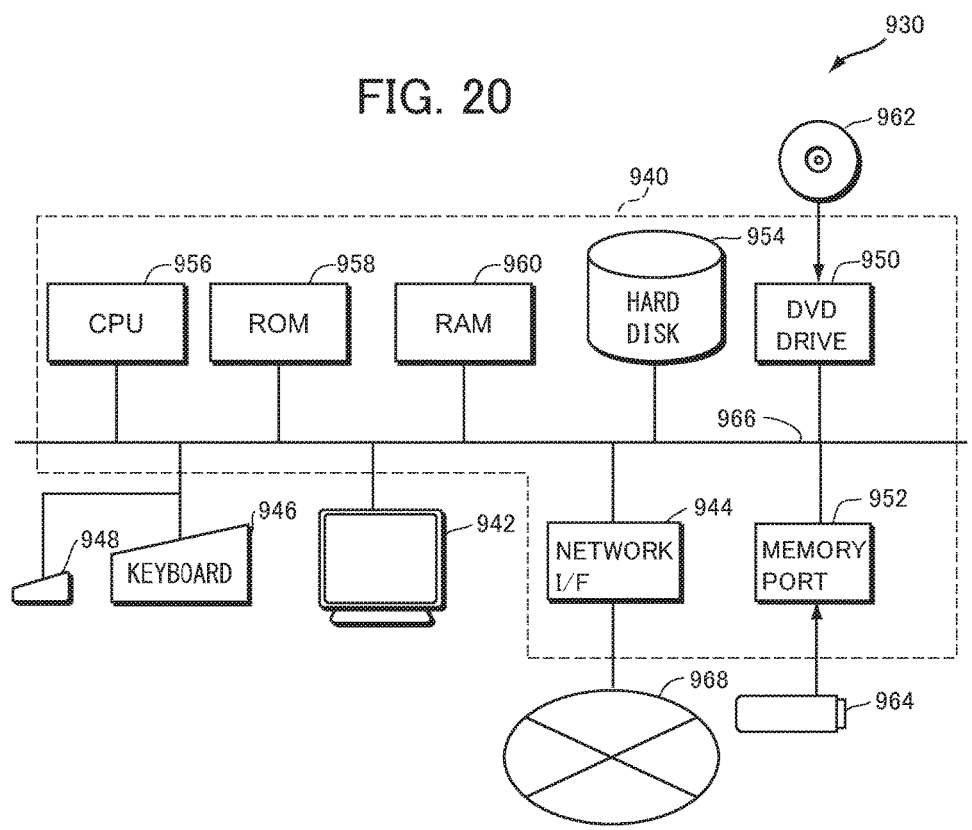
FIG. 20 is a hardware block diagram of the computer of which appearance is shown in FIG. 19.

Referring to FIG. 20, computer 940 includes, in addition to memory port 952 and DVD drive 950, a CPU (Central Processing Unit) 956, a bus 966 connected to CPU 956, memory port 952 and DVD drive 950, a read only memory (ROM) 958 storing a boot-up program and the like, a random access memory (RAM) 960 connected to bus 966, storing program instructions, a system program and work data, and a hard disk 954. Computer system 930 further includes a network interface (I/F) 944 providing the connection to a network 968 allowing communication with another terminal.

The computer program causing computer system 930 to function as each of the functioning sections of the training data generation assisting device 204 in accordance with the embodiment above is stored in a DVD 962 or a removable memory 964 loaded to DVD drive 950 or to memory port 952, and transferred to hard disk 954. Alternatively, the program may be transmitted to computer 940 through network 968, and stored in hard disk 954. At the time of execution, the program is loaded to RAM 960. The program may be directly loaded from DVD 962, removable memory 964 or through network 968 to RAM 960.

The program includes a plurality of instructions to cause computer 940 to operate as functioning sections of the training data generation assisting device 204 in accordance with the embodiment above. Some of the basic functions necessary to cause the computer 940 to realize each of these functioning sections are provided by the operating system running on computer 940, by a third party program, or by various programming tool kits or dynamically linkable program library, installed in computer 940. Therefore, the program may not necessarily include all of the functions necessary to realize the system and method of the present embodiment. The program has only to include instructions to realize the functions of the above-described system by dynamically calling appropriate functions or appropriate program tools in a program tool kit or program library in a manner controlled to attain desired results. Naturally, all the necessary functions may be provided by the program only.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

INDUSTRIAL APPLICABILITY

The present invention is applicable to the industry creating training data used for natural language processing, devices therefor, and to the industry providing various services related to natural language processing using the thus created training data.

REFERENCE SIGNS LIST

150 (zero-)anaphora resolution system
160 annotation data generation assisting system
162 training data DB
164 training system
166 zero anaphor detector
168 anaphor detector
170 antecedent identifier
172 (zero-)anaphora resolution device
190 existing small-scale training data DB
192 text archive
194, 228, 256 language knowledge DB
196 paraphrase/category dictionary
198 pattern dictionary
200, 220, 258 question type DB
202 input/output device
204 training data generation assisting device
206, 226, 260 question-answering system 222 detector training device
224, 262 selectional restriction DB
252 (zero-)anaphora resolver

The invention claimed is:

1. An annotation assisting apparatus assisting generation of annotation data for (zero-)anaphora resolution in a natural language text, comprising:
 a display device and an input device configured to receive a user input through an interactive process with a user;
 a processor configured to:
  read text data to be annotated from a text archive;
  perform morphological analysis and dependency parsing of the read text data;
  output a sequence of morphemes having information indicating dependency structure added;
  search each of the outputted sequence of morphemes for a predicate;
  detect, in dependency relation associated with each of the searched predicates, that a word assumed to have a prescribed relation with each of the searched predicates is missing or replaced by a referring expression;
  identify a position of each of the detected words as an object of an annotating process; and
  estimate, for each identified position of the detected word, a candidate of an expression to be inserted to the identified position, by using a relation between the identified position and surrounding sequence of morphemes and using language knowledge;
 a non-transitory computer readable medium storing the estimated candidates;
 wherein the processor is further configured to read, for each object of the annotating process, the estimated candidates from the non-transitory computer readable medium, and display the candidates on the display device in a manner allowing the user to select any of the one or more candidates; and
 wherein the input device is responsive to a user instruction selecting one of the displayed candidates by adding the selected candidate as an annotation to the position.

2. The annotation assisting apparatus according to claim 1, wherein to estimate the candidate, the processor is configured to:
 generate, for each of the positions of the identified words, a sentence asking a word to fill the position of the word, by using a sequence of words around the position;
 give the generated sentence as an input to a question-answering system prepared in advance; and
 store a candidate word to be inserted to the position of the word in association with the position of the word in the non-transitory computer readable medium, based on the answer obtained from the question-answering system in response to the question sentence given from the question sentence input means.

3. The annotation assisting apparatus according to claim 2, wherein
 the non-transitory computer readable medium stores a plurality of language knowledge rules;
 to estimate the candidate, the processor is further configured to:
  identify, for each identified position of the word, an expression including the identified position of the word and the predicate used for identifying the position of the word and matching one of the language knowledge rules stored in the non-transitory computer readable medium; and
  compare the extracted expressions and the language knowledge rule that matches the expression and store in the non-transitory computer readable medium, from among the expressions, an expression to be inserted to the identified position of the word, as a candidate of character sequence to be inserted to the identified position of the word.

4. The annotation assisting apparatus according to claim 3, wherein
 to estimate the candidate, the processor is further configured to:
  search text included in existing annotated text database prepared in advance for a portion having an annotation related to anaphoric or anaphoric relation; and
  for each searched portion, modify a sentence in accordance with a manner determined in advance for each annotation, and storing the modified portion as a candidate annotation for the searched portion, in the non-transitory computer readable medium.

5. The annotation assisting apparatus according to claim 2, wherein
 to estimate the candidate, the processor is further configured to:
  apply an analyzed sequence of morphemes as an input to another existing (zero-)anaphora resolver;
  receive a result of (zero-)anaphora resolution by the existing (zero-)anaphora resolver; and
  store the result of (zero-)anaphora resolution in the non-transitory computer readable medium.

6. A computer program stored on a non-transitory computer readable medium causing a computer to operate as an annotation assisting apparatus assisting generation of annotation data for (zero-)anaphora resolution of a natural language sentence, the program causing the computer to:
 receive a user input through an interactive process with a user using a display device and an input device of the computer;
 read text data from a text archive as an object of annotation;
 perform morphological analysis and dependency parsing of the read text data;
 output a sequence of morphemes having information indicating dependency structure added;
 search each of the outputted sequence of morphemes for a predicate;
 detect, in dependency relation associated with each of the searched predicates, that a word assumed to have a prescribed relation with each of the searched predicates is missing or replaced by a referring expression;
 identify a position of each of the detected words as an object of an annotating process;
 estimate, for each identified position of the detected word, a candidate of an expression to be inserted to the identified position, by using a relation between the identified position and surrounding sequence of morphemes and using language knowledge;
 store the estimated candidates
 read, for each object of the annotating process, the estimated candidates from the non-transitory computer readable medium;
 display the estimated candidates on the display device in a manner allowing the user to select any of the candidates; and
 respond to a user instruction selecting any of the displayed candidates, by adding the selected candidate as an annotation to the position.

* * * * *